United States Patent
Ishizuka et al.

(10) Patent No.: US 11,613,618 B2
(45) Date of Patent: Mar. 28, 2023

(54) POROUS BODY, AND METHOD FOR PRODUCING POROUS BODY

(71) Applicant: EMAUS KYOTO, INC., Kyoto (JP)

(72) Inventors: Norio Ishizuka, Kyoto (JP); Toshikazu Oda, Kyoto (JP)

(73) Assignee: EMAUS KYOTO, INC., Kyoto (JP)

(*) Notice: Subject to any disclaimer, the term of this patent is extended or adjusted under 35 U.S.C. 154(b) by 0 days.

(21) Appl. No.: 15/734,138

(22) PCT Filed: Feb. 27, 2020

(86) PCT No.: PCT/JP2020/008184
§ 371 (c)(1),
(2) Date: Dec. 1, 2020

(87) PCT Pub. No.: WO2020/179642
PCT Pub. Date: Sep. 10, 2020

(65) Prior Publication Data
US 2021/0214514 A1    Jul. 15, 2021

(30) Foreign Application Priority Data

Mar. 4, 2019 (JP) .............................. JP2019-038971

(51) Int. Cl.
C08J 9/00 (2006.01)
C08G 59/24 (2006.01)
C08G 59/62 (2006.01)

(52) U.S. Cl.
CPC ............ C08J 9/0009 (2013.01); C08G 59/24 (2013.01); C08G 59/621 (2013.01); C08J 2363/00 (2013.01)

(58) Field of Classification Search
CPC ..... C08J 9/0009; C08J 2363/00; C08G 59/24; C08G 59/621
(Continued)

(56) References Cited

U.S. PATENT DOCUMENTS

2006/0135710 A1* 6/2006 Shirrell ............... C08G 59/621
                                                              525/481
2007/0036959 A1    2/2007 Yamato et al.
(Continued)

FOREIGN PATENT DOCUMENTS

CN         1856533        11/2006
CN       102137758         7/2011
(Continued)

OTHER PUBLICATIONS

International Search Report issued in International Application No. PCT/JP2020/008184, dated May 20, 2020, 6 pages w/translation.
(Continued)

*Primary Examiner* — David T Karst
(74) *Attorney, Agent, or Firm* — Hamre, Schumann, Mueller & Larson, P.C.

(57) ABSTRACT

The present invention provides a porous body, the swelling of which under acidic conditions is suppressed, and a method for producing the porous body. The first porous body of the present invention is formed of a copolymer of an epoxy compound and a curing agent, wherein the porous body is a porous body containing no primary to tertiary amino groups and has an interconnected pore structure in which holes provided inside the porous body communicate with each other. The second porous body of the present invention is formed of a copolymer of an epoxy compound and a curing agent, wherein the porous body is a porous body containing no nitrogen atom to be quaternized by acid treatment, and has an interconnected pore structure in which holes provided inside the porous body communicate with each other.

21 Claims, 3 Drawing Sheets

Example 1 SEM

(58) Field of Classification Search
USPC .......................................................... 525/98
See application file for complete search history.

(56) References Cited

U.S. PATENT DOCUMENTS

| | | |
|---|---|---|
| 2008/0210626 A1 | 9/2008 | Tsujioka et al. |
| 2011/0217512 A1 | 9/2011 | Heishi et al. |
| 2012/0153230 A1 | 6/2012 | Kamiya |
| 2013/0177817 A1 | 7/2013 | Noumi |
| 2015/0336797 A1 | 11/2015 | Lakrout et al. |
| 2016/0038884 A1 | 2/2016 | Hikita et al. |
| 2018/0161758 A1 | 6/2018 | Ishizuka et al. |
| 2018/0223067 A1 | 8/2018 | Ishizuka et al. |
| 2018/0230284 A1 | 8/2018 | Ishizuka et al. |

FOREIGN PATENT DOCUMENTS

| | | |
|---|---|---|
| CN | 103249754 | 8/2013 |
| CN | 103435969 | 12/2013 |
| CN | 104411628 | 3/2015 |
| CN | 105209162 | 12/2015 |
| JP | 2003-073526 | 3/2003 |
| JP | 2011-137183 | 7/2011 |
| JP | 2011-148911 | 8/2011 |
| JP | 4940367 B | 5/2012 |
| JP | 5153142 B | 2/2013 |
| JP | 2013-067794 | 4/2013 |
| JP | 2014-114399 | 6/2014 |
| JP | 2015-084297 | 4/2015 |
| JP | 2017-036381 | 2/2017 |
| JP | 2017-037070 | 2/2017 |
| JP | 2019-029460 | 2/2019 |
| WO | 2011/019033 | 2/2011 |
| WO | 2017/026424 | 2/2017 |
| WO | 2017/026425 | 2/2017 |
| WO | 2017/026426 | 2/2017 |

OTHER PUBLICATIONS

Extended European Search Report issued in corresponding European Patent Application No. 20765487.2 dated Jan. 28, 2022, 7 pages.
Office Action of the corresponding Chinese Patent Application No. 202080002913.0, dated Jun. 13, 2022, 16 pages w/translation.
Thesis by Norio Tsujioka, , "Studies on monolithic epoxy-based porous materials obtained by polymerization induced phase separation", 2009, 159 pages.
Office Action issued in corresponding European Patent Application No. 20765487.2, dated Jan. 30, 2023, 11 pages.

* cited by examiner

Example 1 SEM

Example 5 (particle 1) appearance

POROUS BODY, AND METHOD FOR PRODUCING POROUS BODY

TECHNICAL FIELD

The present invention relates to a porous body and a method for producing a porous body.

BACKGROUND ART

Various porous epoxy resin bodies having holes with a co-continuous structure formed by spinodal decomposition have been proposed. These are used, for example, in thin films for battery separator, particles for separating agent, and the like (Patent Literatures 1 to 4).

CITATION LIST

Patent Literature

Patent Literature 1: JP 5153142 B
Patent Literature 2: JP 4940367 B
Patent Literature 3: WO2017/026424
Patent Literature 4: JP2017-037070 A

SUMMARY OF INVENTION

Technical Problem

Most of the curing agents used in the production of porous epoxy resin bodies using spinodal decomposition are amine curing agents. Since a porous epoxy resin body cured with an amine curing agent contains an amino group in a main chain, it may swell due to quaternization under acidic conditions. In the case where such a porous epoxy resin body is used as a filler of a column, for example, when an acidic liquid is flowed, there is a possibility that the liquid swells and hardly flows.

With the foregoing in mind, it is an object of the present invention to provide a porous body, the swelling of which under acidic conditions is suppressed, and a method for producing the porous body.

Solution to Problem

In order to achieve the above object, the present invention provides a first porous body formed of a copolymer of an epoxy compound and a curing agent, wherein the porous body is a porous body containing no primary to tertiary amino groups and has an interconnected pore structure in which holes provided inside the porous body communicate with each other.

The present invention also provides a second porous body formed of a copolymer of an epoxy compound and a curing agent, wherein the porous body is a porous body containing no nitrogen atom to be quaternized by acid treatment, and has an interconnected pore structure in which holes provided inside the porous body communicate with each other.

In the following, the first porous body of the present invention and the second porous body of the present invention may be collectively referred to as "the porous body of the present invention".

The present invention also provides a method for producing a porous body according to the present invention (hereinafter, may be referred to simply as "the production method of the present invention"), the method including: a dispersion preparation step of preparing a dispersion by dispersing a porous body raw material including an epoxy compound and a curing agent in a dispersion medium; and a polymerization step of polymerizing the porous body raw material in the dispersion, wherein in the polymerization step, the holes are formed by spinodal decomposition.

Advantageous Effects of Invention

According to the present invention, it is possible to provide a porous body, the swelling of which under acidic conditions is suppressed, and a method for producing the porous body.

DESCRIPTION OF EMBODIMENTS

Figure 1:
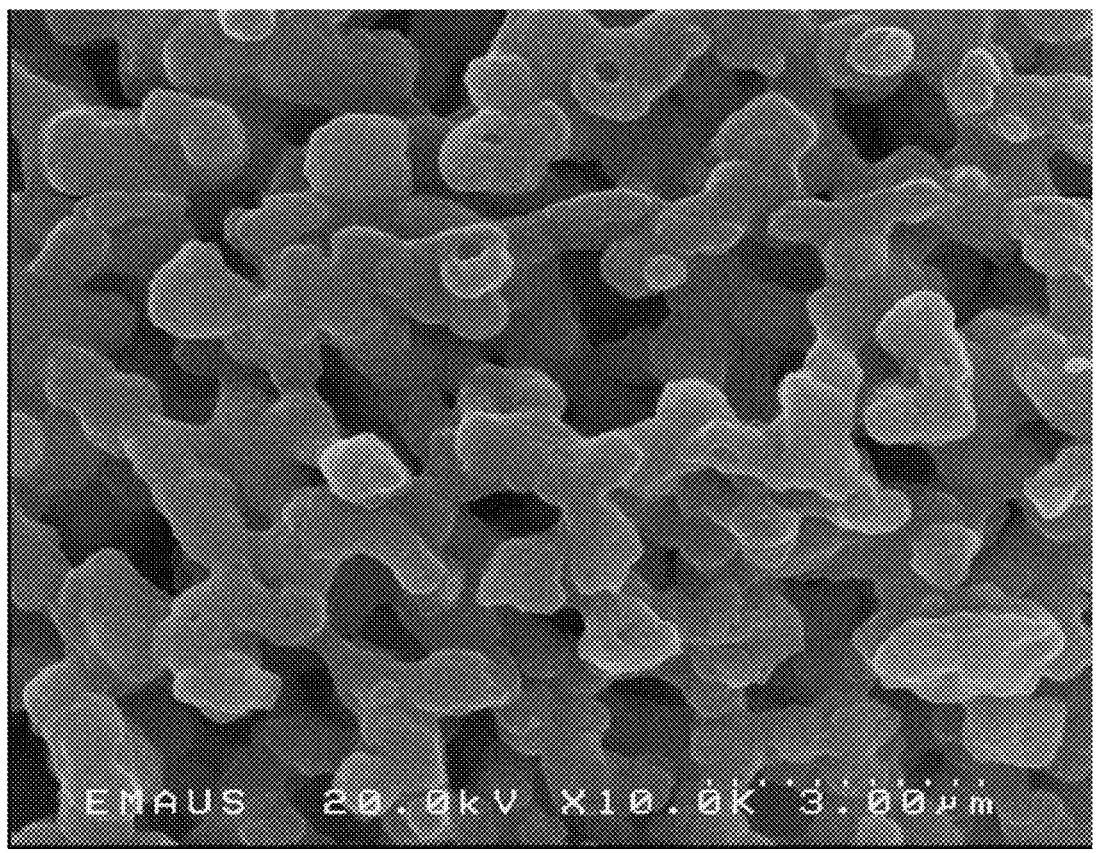
FIG. 1 is a SEM image of the surface of a porous body of Example 1.

The present invention will be described below with reference to illustrative examples. It is to be noted, however, that the present invention is by no means limited by the following descriptions.

In the porous body of the present invention, for example, the epoxy compound may be an epoxy compound containing no primary to tertiary amino groups.

In the porous body of the present invention, for example, the epoxy compound may be an epoxy compound containing no nitrogen atom to be quaternized by acid treatment.

In the porous body of the present invention, for example, the epoxy compound may be an epoxy compound represented by the following chemical formula (E1).

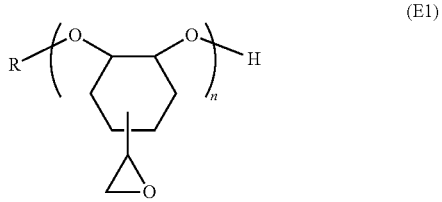

(E1)

In the chemical formula (E1), n is a positive integer, and R is a hydrogen atom or a substituent.

In the porous body of the present invention, for example, in the chemical formula (E1), n may be 10 to 15.

In the porous body of the present invention, for example, the epoxy compound represented by the chemical formula (E1) may be a 1,2-epoxy-4-(2-oxiranyl)cyclohexane adduct of 2,2-bis(hydroxymethyl)-1-butanol.

In the porous body of the present invention, for example, the curing agent may be a curing agent containing no primary to tertiary amino groups.

In the porous body of the present invention, for example, the curing agent may be a curing agent containing no nitrogen atom to be quaternized by acid treatment.

In the porous body of the present invention, for example, the curing agent may be a phenolic compound.

In the porous body of the present invention, for example, the phenolic compound may be a phenolic compound containing three or more phenolic hydroxyl groups in one molecule.

In the porous body of the present invention, for example, the interconnected pore structure in which holes communicate with each other may be an interconnected pore structure in which through holes communicate with each other.

In the porous body of the present invention, for example, ends of the through holes are open toward an outside of the porous body.

The porous body of the present invention may be a porous particle, for example.

The porous body of the present invention may be a substantially spherical particle, for example.

In the porous body of the present invention, for example, each of the porous particle may be shaped so that the longest diameter is not more than 1.6 times the shortest diameter.

In the porous body of the present invention, for example, each porous particle may have a mean particle size in a range from 0.5 to 30,000 μm.

In the dispersion preparation step in the method for producing a porous body of the present invention, for example, a curing accelerator may be further dispersed in a dispersion medium.

In the dispersion preparation step in the method for producing a porous body of the present invention, for example, the porous body raw material may be dispersed in the dispersion medium together with a dispersant.

In the method for producing a porous body of the present invention, for example, the dispersant may be a block copolymer including a hydrophobic polymer block and a hydrophilic polymer block.

The method for producing a porous body of the present invention may further include a dispersant production step of producing the dispersant, wherein the dispersant production step includes: a first living radical polymerization step of forming one of the hydrophobic polymer block and the hydrophilic polymer block by living radical polymerization; and a second living radical polymerization step of forming the other one of the hydrophobic polymer block and the hydrophilic polymer block by living radical polymerization after the first living radical polymerization step, for example.

In the method for producing a porous body of the present invention, for example, the dispersant may be a surfactant.

[1. Porous Body]

The porous body of the present invention is a porous body formed of a copolymer of an epoxy compound and a curing agent, as described above.

[1-1. Epoxy Compound]

It is preferred that the epoxy compound contains no primary to tertiary amino groups. Furthermore, it is preferable that the epoxy compound contains no nitrogen atom to be quaternized by acid treatment. A nitrogen atom such as an amide bond, a urethane bond, or the like will not be quaternized even under acidity.

The first porous body of the present invention contains no primary to tertiary amino groups as described above. This condition is satisfied as long as the first porous body of the present invention to be produced contains no primary to tertiary amino groups even when the epoxy compound contains primary to tertiary amino groups or the epoxy compound contains a nitrogen atom to be quaternized by acid treatment.

The second porous body of the present invention contains no nitrogen atom to be quaternized by acid treatment as described above. This condition is satisfied as long as the first porous body of the present invention to be produced contains no nitrogen atom to be quaternized by acid treatment even when the epoxy compound contains primary to tertiary amino groups or the epoxy compound contains a nitrogen atom to be quaternized by acid treatment.

Only one type of the epoxy compounds may be used, or two or more types of the epoxy compounds may be used in combination. In addition, for example, it is possible to use an epoxy compound containing a nitrogen atom instead or in addition in a range in which an adverse effect due to swelling and inhibition during an addition reaction are acceptable.

It is preferable that the epoxy compound has a larger number of epoxy groups in one molecule, so that a porous structure is easily formed. Specifically, for example, the number of epoxy groups in one molecule of the epoxy compound may be 5 or more or 10 or more, and the upper limit thereof is not particularly limited, and may be, for example, 30 or less or 15 or less. Further, it is preferable that the epoxy compound does not include an epoxy compound having two or less epoxy groups in one molecule.

The epoxy compound may be, for example, at least one of an epoxy monomer and an epoxy prepolymer. For example, as the epoxy compound, at least one of an epoxy monomer and an epoxy prepolymer corresponding to the structure of a porous body to be produced can be used.

Specific examples of the epoxy compound are not particularly limited, and are, for example, as follows.

Examples of the epoxy compound containing no primary to tertiary amino groups include a phenolic novolac type resin and EHPE3150 (trade name of Daicel Corporation, details will be described below).

Examples of the epoxy compound containing primary to tertiary amino groups include a glycidylamine-type TETRAD-C (trade name of Mitsubishi Gas Chemical Company, Inc.) and a TEPIC having a triazine ring (trade name of Nissan Chemical Corporation).

The structure of TETRAD-C is represented by the following chemical formula (1).

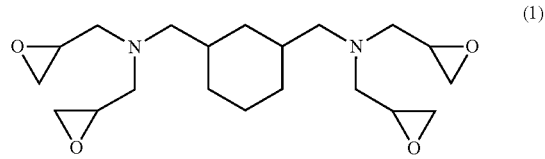 [SMILES: C1CC(CN(CC2CO2)CC2CO2)CC(CN(CC2CO2)CC2CO2)C1]

(1)

The structure of TEPIC is represented by the following chemical formula (4). Examples of TEPIC series include TEPIC-L, TEPIC-VL, TEPIC-FL, TEPIC-PAS, and TEPIC-UC. These are obtained by changing a part of the structure of the following chemical formula (4), and have a structure similar to that of TEPIC.

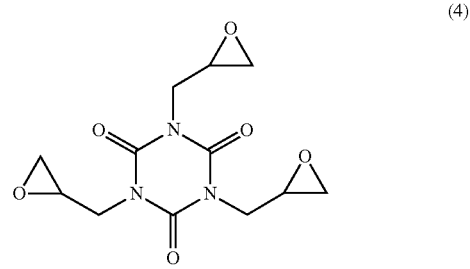 [SMILES: O=c1n(CC2CO2)c(=O)n(CC2CO2)c(=O)n1CC1CO1]

(4)

Examples of the epoxy compound containing no nitrogen atom include a bisphenol-type epoxy compound, a novolac-type epoxy compound, and an alicyclic-type EIHPE3150

(trade name of Daicel Corporation). In particular, EHPE3150 and a novolac-type epoxy compound are preferred. Note that EHPE3150 has a chemical structure of "1,2-epoxy-4-(2-oxylanyl)cyclohexane adduct of 2,2-bis (hydroxymethyl)-1-butanol", and can be represented by the following chemical formula (E1). In the following chemical formula (E1), n is a positive integer and is, for example, 10 to 15.

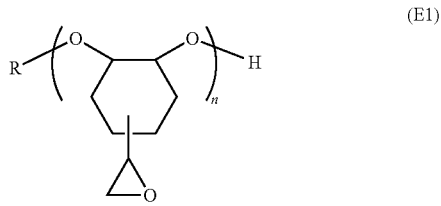

(E1)

The epoxy compound (e.g., at least one of an epoxy monomer and an epoxy prepolymer) may be, a polyfunctional-epoxy group-containing compound, for example.

The polyfunctional-epoxy group-containing compound is an epoxy compound having two or more epoxy groups in one molecule, preferably having three or more epoxy groups, e.g., three or four epoxy groups, in one molecule. By using a polyfunctional-epoxy group-containing compound having three or more epoxy groups in one molecule, for example, it is possible to produce porous epoxy resin particles having a suitable pore diameter and a suitable strength. The polyfunctional-epoxy group-containing compound may be either an aromatic epoxy compound or a non-aromatic epoxy compound, for example. Also, the polyfunctional-epoxy group-containing compound may be either a high molecular weight compound (e.g., an oligomer or a prepolymer) or a low molecular weight compound (e.g., a monomer), for example.

The aromatic epoxy compound may be, for example, a bisphenol A-type epoxy compound, a brominated bisphenol A-type epoxy compound, a bisphenol F-type epoxy compound, a bisphenol AD-type epoxy compound, a stilbene-type epoxy compound, a biphenyl-type epoxy compound, a bisphenol A novolac-type epoxy compound, a cresol novolac-type epoxy compound, diaminodiphenylmethane-type epoxy compound, a polyphenyl-based epoxy compound such as a tetrakis (hydroxyphenyl) ethane-based epoxy compound, a fluorine-containing epoxy compound, or a heteroaromatic ring-containing epoxy compound such as a triazine ring-containing epoxy compound.

The aromatic epoxy compound may be, for example, a bisphenol A-type epoxy compound, a brominated bisphenol A-type epoxy compound, a bisphenol F-type epoxy compound, a bisphenol AD-type epoxy compound, a fluorene-containing epoxy compound, or triglycidyl isocyanurate. Particularly preferably, the aromatic epoxy compound may be a bisphenol A-type epoxy compound, a brominated bisphenol A-type epoxy compound, a bisphenol F-type epoxy compound, a bisphenol AD-type epoxy compound, or a fluorene-containing epoxy compound, each having an epoxy equivalent of 500 or less and a melting point of 100° C. or lower. The aromatic epoxy compound may be N,N, N',N'-tetraglycidyl-m-xylylenediamine (the compound obtained by replacing the cyclohexane ring in the chemical formula (1) shown below by a benzene ring), for example.

The non-aromatic epoxy compound is, for example, an aliphatic glycidyl ether-type epoxy compound, an aliphatic glycidyl ester-type epoxy compound, an alicyclic glycidyl ether-type epoxy compound, or an alicyclic glycidyl ester-type epoxy compound. Preferably, the non-aromatic epoxy compound is an alicyclic glycidyl ether-type epoxy compound, an alicyclic glycidyl ester-type epoxy compound, or the like. Particularly preferably, the non-aromatic epoxy compound is an alicyclic glycidyl ether-type epoxy compound or an alicyclic glycidyl ester-type epoxy compound each having an epoxy equivalent of 500 or less and a melting point of 100° C. or below.

The non-aromatic epoxy compound preferably is an alicyclic epoxy compound having three or more epoxy groups, e.g., three or four epoxy groups, in one molecule, for the reason described above.

The alicyclic epoxy compound having three or more epoxy groups in one molecule is not particularly limited, and an alicyclic epoxy compound having an alicyclic hydrocarbon group and three or more epoxy groups can be used as appropriate. From the viewpoint of further enhancing the hydrophilicity, it is preferable that the alicyclic epoxy compound contains nitrogen atoms. The alicyclic epoxy compound containing nitrogen atoms may be a compound represented by the following chemical formula (A), for example.

$X—(NY_2)_m$ (A)

In the chemical formula (A), X is an alicyclic hydrocarbon group having 3 to 8 carbon atoms and bound to the nitrogen atom in the formula either directly or via a straight-chain alkylene group having 1 to 5 carbon atoms. Ys may be the same or different from each other, and may each be a hydrogen atom, or an epoxy group bound to the nitrogen atom in the formula either directly or via a straight-chain alkylene group having 1 to 5 carbon atoms. m is 2, 3 or 4 (particularly preferably 2). Y and m are selected in such a manner that three or more epoxy groups are present in the chemical formula (A). The respective "$NY_2$"s may be the same or different from each other.

As described above, X in the chemical formula (A) is an alicyclic hydrocarbon group having 3 to 8 carbon atoms (more preferably 4 to 7, still more preferably 5 to 6) and bound to the nitrogen atom in the formula either directly or via a straight-chain alkylene group having 1 to 5 carbon atoms (more preferably 1 to 3, still more preferably 1). The straight-chain alkylene group that may be present between the nitrogen atom and the alicyclic hydrocarbon group is a methylene group, an ethylene group, a propylene group, or the like, for example. From the viewpoint of preventing deterioration of the mechanical strength of the porous particles, it is preferable that the number of carbon atoms in the straight-chain alkylene group does not exceed the above upper limit. Examples of such an X include groups represented by the following formulae (I) to (VI).

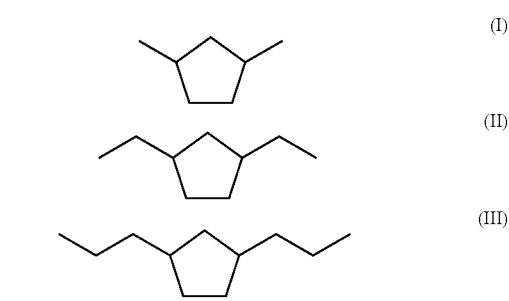

(I)

(II)

(III)

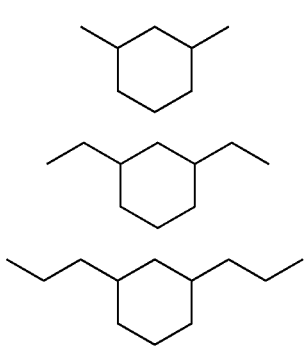

(IV)

(V)

(VI)

As described above, Y in the chemical formula (A) may be an epoxy group bound to the nitrogen atom in the formula either directly or via a straight-chain alkylene group having 1 to 5 carbon atoms (more preferably 1 to 3, still more preferably 1). The straight-chain alkylene group is not particularly limited, and may be the same as the straight-chain alkylene group described above in connection with X, for example.

As described above, m in the chemical formula (A) is 2, 3, or 4. From the viewpoint of preventing a cross-linking reaction from being inadequate, it is preferable that m is 2 or more. From the viewpoint of preventing a decrease in reactivity caused by steric hindrance, it is preferable that m is 4 or less. As described above, in the respective "NY$_2$"s in the chemical formula (A), Ys may be the same or different from each other, and may each be a hydrogen atom, or an epoxy group bound to the nitrogen atom in the formula either directly or via a straight-chain alkylene group having 1 to 5 carbon atoms. In the respective "NY$_2$"s, it is preferable that at least one Y (preferably, both the two Ys) is the epoxy group. The number of epoxy groups in the chemical formula (A) preferably is not too small from the viewpoint of preventing a cross-linking reaction from being inadequate, and preferably is not too large from the viewpoint of preventing a decrease in reactivity caused by steric hindrance.

Specific examples of the alicyclic epoxy compound having three or more epoxy groups in one molecule include compounds represented by the following chemical formulae (1A) and (1).

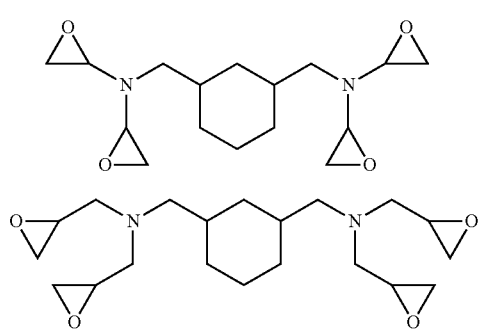

The non-aromatic epoxy compound may be, for example, a compound having an isocyanuric ring, such as "isocyanuric acid triglycidyl", i.e., triglycidyl isocyanurate (2,2,2,-tri-(2,3-epoxypropyl)-isocyanurate), represented by the chemical formula (4) in an example of the present invention to be described below.

From the viewpoint of imparting high hydrophilicity to a porous body to be obtained, the polyfunctional-epoxy group-containing compound preferably has nitrogen atoms. In particular, from the viewpoint of compatibility and reactivity with polyfunctional-amino group-containing compounds and the strength of porous epoxy resin particles to be obtained, N,N,N',N'-tetraglycidyl-m-xylylenediamine is preferable. Also, from the viewpoint of high hydrophilicity and broad utility of the raw material, triglycidyl isocyanurate is preferable.

Only one type of polyfunctional-epoxy group-containing compound may be used, or two or more types of polyfunctional-epoxy group-containing compounds may be used in combination.

The polyfunctional-epoxy group-containing compound used as the raw material of the porous body may be either an aromatic amino compound or a non-aromatic amino compound, for example.

Examples of the aromatic amino compound include: aromatic amino compounds such as meta-phenylenediamine, diaminodiphenylmethane, diaminodiphenylsulfone, benzyldimethylamine, and dimethylaminomethylbenzene; aromatic acid anhydrides such as phthalic anhydride, trimellitic anhydride, and pyromellitic anhydride; and amino compounds with a heteroaromatic ring(s) like a triazine ring, such as phenol resins and phenol novolac resins. The aromatic amino compound preferably is an aromatic amino compound having two or more primary amino groups in a molecule, particularly preferably meta-phenylenediamine, diaminodiphenylmethane, or diaminodiphenylsulfone.

Examples of the non-aromatic amino compound include: aliphatic amino compounds such as ethylenediamine, diethylenetriamine, triethylenetetramine, tetraethylenepentamine, iminobispropylamine, bis(hexamethylene)triamine, 1,3, 6-trisaminomethylhexane, polymethylenediamine, trimethylhexamethylenediamine, and polyether diamine; alicyclic amino compounds such as isophorone diamine, menthane diamine, N-aminoethylpiperazine, 3,9-bis(3-aminopropyl)2,4,8,10-tetraoxaspiro(5,5)undecane adduct, bis (4-amino-3-methylcyclohexyl)methane, bis(4-aminocyclohexyl)methane, and modifications thereof, and aliphatic polyamide amino compounds each composed of a polyamino compound and a dimer acid.

Among them, from the viewpoint of achieving a cross-linking reaction efficiently, alicyclic amino compounds having two or more primary amino groups in a molecule are preferable. It is more preferable that the non-aromatic amino compound is at least one selected from the group consisting of isophorone diamine, menthane diamine, bis(4-amino-3-methylcyclohexyl)methane, bis(4-aminocyclohexyl)methane, and modifications thereof. Among them, bis(4-amino-3-methylcyclohexyl)methane and bis(4-aminocyclohexyl) methane represented by the chemical formula (2) in an example of the present invention to be described below are particularly preferable. Examples of the modifications of such amines include various modifications such as epoxy modifications, carboxylic acid modifications, urea modifications, modifications with a ketone compound, and modifications with a silane compound, and a modification obtained by modifying any of the above-described alicyclic amino compounds by a known method can be used as appropriate.

Only one type of polyfunctional-amino group-containing compound may be used alone, or two or more types of polyfunctional-amino group-containing compounds may be used in combination.

[1-2. Curing Agent]

The porous body of the present invention is a porous body formed of a copolymer of an epoxy compound and a curing agent, as described above. The curing agent is not particularly limited. Only one type of the curing agent may be used, or two or more types of the epoxy compounds may be used in combination.

The first porous body of the present invention contains no primary to tertiary amino groups as described above. This condition is satisfied as long as the first porous body of the present invention to be produced contains no primary to tertiary amino groups even when the curing agent contains primary to tertiary amino groups or the curing agent contains a nitrogen atom to be quaternized by acid treatment.

The second porous body of the present invention contains no nitrogen atom to be quaternized by acid treatment as described above. This condition is satisfied as long as the first porous body of the present invention to be produced contains no nitrogen atom to be quaternized by acid treatment even when the curing agent contains primary to tertiary amino groups or the curing agent contains a nitrogen atom to be quaternized by acid treatment.

As the curing agent, for example, a curing agent for a general epoxy resin can be used. Examples of the curing agent containing no primary to tertiary amino groups include a phenol compound, an acid anhydride, and a polymercaptan, and particularly, a phenol compound is preferred.

There has been no example of actually producing a porous body by a copolymer of an epoxy compound and a curing agent containing no primary to tertiary nitrogen atoms so far. For inventing the porous body of the present invention, the inventors of the present invention have studied various combinations of epoxy compounds and phenol compounds. As a result, it has been found that a porous structure can be formed with a curing agent containing no nitrogen atom by using a phenol resin from which a low functional group component having two or less hydroxyl groups is removed rather than a general phenol novolac resin. However, in the porous body of the present invention, the epoxy compound and the phenol compound are not limited thereto as described above.

As the phenol compound used as the curing agent, there are a phenol novolac type, a triphenylmethane type, a tetrakis phenol ethane type, a xylylene type, a biphenylene type, a naphthol/cresol type, and a dicyclopentadiene type, and the like, and it is preferable to contain three (trifunctional) or more phenolic hydroxyl groups in one molecule. Further, it is preferable that the phenol compound does not include a phenol compound having two (bifunctional) or less phenolic hydroxyl groups in one molecule. This is because, a co-continuous structure (an interconnected pore structure in which holes communicate with each other) by phase separation due to spinodal decomposition is liable to be formed when the number of phenolic hydroxyl groups contained in one molecule is larger in the curing agent.

The curing agent is preferably a phenol novolac type, a triphenylmethane type, a xylylene type, a biphenylene type, or a naphthol/cresol type, not containing bifunctional or less functional components, and is particularly preferably a phenol novolac type or a triphenylmethane type, not containing bifunctional or less functional components.

As described above, two or more of the curing agents can be used in combination, and as long as the co-continuous structure can be achieved by phase separation due to spinodal decomposition, the curing agent having a bifunctional or less functional components can be used in addition. Examples of the phenol novolac type not containing bifunctional or less functional components include DL-92 (trade name of Meiwa Plastic Industries, Ltd., the one obtained by removing dimer from phenol novolac-type H-4 (trade name of Meiwa Plastic Industries, Ltd.)), and MEH-7500 (trade name of Meiwa Plastic Industries, Ltd.). DL-92 can be represented by the following chemical formula (F1). In the following chemical formula (F1), n is a positive integer, and is, for example, about 3 to 10.

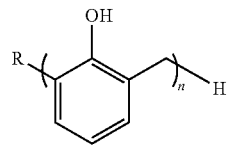

(F1)

[1-3. Curing Accelerator]

In the method for producing a porous body of the present invention, substances other than the epoxy compound and the curing agent may or may not be used as appropriate. Note that the method for producing a porous body of the present invention will be described below. As the substance other than the epoxy compound and the curing agent, for example, a curing accelerator may be used. The curing accelerator is not particularly limited, and may be any known compound. Examples of the curing accelerator that can be used suitably include: tertiary amines such as triethylamine and tributylamine; and imidazoles such as 2-phenol-4-methylimidazole, 2-ethyl-4-methylimidazole, and 2-phenol-4,5-dihydroxymethylimidazole Only one type of the curing accelerator may be used, or two or more types of the curing accelerators may be used in combination.

By using the curing accelerator, for example, the reaction temperature can be lowered to accelerate the copolymerization of the epoxy compound and the curing agent.

The curing accelerator is not particularly limited as described above, and known ones can be used, but imidazole and derivatives thereof, DBU, DBN and salts of organic acids thereof as tertiary amines are preferred. When a part of the imidazole and its derivative remains in the porous body of the present invention, for example, there is a possibility that the imidazole and its derivative cause swelling under acidic conditions or become an inhibitory factor during addition reaction. DBU and DBN are more preferred because such problems are unlikely to occur. The formal names and chemical structural formulae of DBU and DBN are as follows.

DBU

Diazabicycloundecene (1,8-diazabicyclo[5.4.0]undec-7-ene)

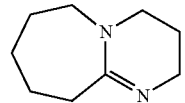 [SMILES: C1CCC2=NCCCN2CC1]

DBN
Diazabicyclononene
(1,5-diazabicyclo[4.3.0]non-5-ene)

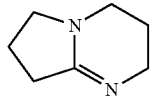

[1-4. Porogen]

In the method for producing a porous body of the present invention, for example, porogen may be used as the substance other than the epoxy compound and the curing agent.

In the present invention, the term "porogen" means an inactive solvent or an inactive solvent-containing mixture serving as a pore forming agent. A porogen is present in a polymerization reaction that forms a porous polymer at a certain stage of polymerization. By removing the porogen from the reaction mixture at a predetermined stage, a porous epoxy resin cured product having a three-dimensional network structure with mutually communicating spaces is obtained.

In the present invention, the porogen is, for example, a solvent in which the porous particle raw material and the curing agent can be dissolved and reaction-induced phase separation can be caused after the polymerization of the porous particle raw material and the curing agent. Examples of the porogen include: cellosolves such as methyl cellosolve and ethyl cellosolve; esters such as ethylene glycol monomethyl ether acetate and propylene glycol monomethyl ether acetate; and glycols such as polyethylene glycol and polypropylene glycol. Among them, polyethylene glycol, methyl cellosolve, ethyl cellosolve, ethylene glycol monomethyl ether acetate, and propylene glycol monomethyl ether acetate each having a molecular weight of about 200 to about 20,000 are preferable, and polyethylene glycol (PEG) and propylene glycol monomethyl ether acetate each having a molecular weight of about 200 to about 20,000 are particularly preferable. Only one type of porogen may be used, or two or more types of porogens may be used in combination.

In the present invention, it is desirable to use, as a porogen, polyalkylene glycol or a polyalkylene glycol derivative having a hydroxy group(s) and a hydroxyl value of 100 (mg KOH/g) or more, for example. When the hydroxyl value is less than 100 (mg KOH/g), the viscosity is too high. As a result, it may be difficult for a porous epoxy resin cured product to have a sufficiently large diameter or the effect of imparting hydrophilicity to the porous epoxy resin cured product may be deteriorated. The reason for this is considered as follows: since the amount of the hydroxy group on the surface of the porous epoxy resin cured product is closely related to the hydroxyl equivalent of the porogen, the amount of the hydroxy group appearing on the surface of the epoxy resin cured product reduces as the hydroxyl value of the porogen becomes smaller, whereby the hydrophilicity of the surface is deteriorated. The porogen can be used not only for the synthesis of porous epoxy resin particles but also for the synthesis of porous particles made of other materials.

As described above, the porogen is not particularly limited. For example, PEG having a molecular weight of about 200 and PEG having a larger molecular weight are preferably used in combination. In particular, PEG having a molecular weight of about 200 and PEG having a molecular weight of about 10000 are preferably used in combination.

[2. Method for Producing Porous Body of the Present Invention]

As described above, the method for producing a porous body of the present invention includes a dispersion preparation step of preparing a dispersion by dispersing a porous body raw material including an epoxy compound and a curing agent in a dispersion medium; and a polymerization step of polymerizing the porous body raw material in the dispersion, wherein in the polymerization step, the holes are formed by spinodal decomposition. The hole may be, for example, a through hole as described above.

In the porous body production method according to the present invention, for example, in the dispersion preparation step, the porous body raw material is dispersed in the dispersion medium together with the dispersant. The dispersant may be a surfactant, for example.

In the porous body production method according to the present invention, the dispersant may be, for example, the block copolymer according to the present invention, containing a hydrophobic polymer block and a hydrophilic polymer block. In the following, such a block copolymers may be referred to as "the block copolymer of the present invention". In this case, for example, the porous body production method according to the present invention may further include a dispersant production step of producing the dispersant (the block copolymer of the present invention). The dispersant production step may include a first living radical polymerization step of forming one of the hydrophobic polymer block and the hydrophilic polymer block by living radical polymerization and a second living radical polymerization step of forming the other one of the hydrophobic polymer block and the hydrophilic polymer block by living radical polymerization after the first living radical polymerization step. Since the block copolymer of the present invention contains a hydrophobic polymer block and a hydrophilic polymer block, it can be referred to as a "surfactant" in a broad sense.

According to the production method of the present invention, it is possible to produce a porous body having an interconnected pore structure in which through holes communicate with each other, having a substantially spherical outer shape, and having no skin layer, for example. Although the mechanism thereof is unknown, for example, it is speculated that such a porous body can be produced because the interface between the porous body raw material and the dispersion medium can be maintained in a suitable state. More specifically, it is speculated that, for example, when the interface is maintained in a suitable state, the porous body raw material can be polymerized without causing agglutination, so that the above-described through holes can be formed. It is also speculated that, since the state where the porous body raw material is dispersed in the dispersion medium in the form of particles can be maintained, it is possible to produce the substantially spherical porous body of the present invention, for example. If either one of the hydrophilic substance and the hydrophobic substance contained in the porous body raw material is present disproportionately at the interface, for example, a skin layer may be formed by polymerization or the like of the substance. The through holes on the surface of the porous body are likely to be closed by this skin layer. However, by controlling the hydrophilic substance and the hydrophobic substance so as to be present at a suitable ratio at the interface, it is possible to prevent the formation of the skin layer. It is to be noted, however, that this mechanism is merely illustrative and does not limit the present invention by any means.

The method for maintaining the interface between the porous body raw material and the dispersion medium in a suitable state is not particularly limited, and may be, for example, the use of the surfactant or the block copolymer (dispersant) of the present invention, which is a surfactant in a broad sense. In the surfactant or the block copolymer (dispersant), it is preferable to control the ratio between a hydrophobic moiety and a hydrophilic moiety part appropriately, as will be described below. Another example of the method for maintaining the interface between the porous body raw material and the dispersion medium in a suitable state is to physically stir the dispersion.

The term "spinodal decomposition" as used in the present invention refers to a phenomenon in which a multi-component mixed system causes phase separation (e.g., a two-component mixed system is separated into two phases) while forming a co-continuous structure, or the state where such phase separation has occurred. The term "spinodal decomposition" generally may be used to refer to the process of two-phase separation caused when a two-component mixed system at a high temperature is brought into an unstable state by quenching the system, for example. However, in the present invention, the term "spinodal decomposition" is not limited to the one caused by quenching. That is, in the present invention, the method for causing the spinodal decomposition is not particularly limited, and may be any method. For example, it is considered that, by dispersing a porous body raw material in a dispersion medium and polymerizing or crosslinking the porous body raw material while maintaining the interface between the porous body raw material and the dispersion medium in a suitable state, the spinodal decomposition is caused and the structure is fixed. The method for maintaining the interface between the porous body raw material and the dispersion medium in a suitable state is as described above, for example.

Hereinafter, the method for producing a porous body of the present invention will be described more in detail with reference to examples.

[2-1. Dispersion]

In the production method of the present invention, first, a porous body raw material containing an epoxy compound and a curing agent is dispersed in a dispersion medium to prepare a dispersion (dispersion preparation step). The epoxy compound is not particularly limited, and examples thereof include the epoxy compounds described above. The epoxy compound is a raw material of a material (e.g., an epoxy resin) for forming a porous body to be produced. As the epoxy compound, for example, at least one of an epoxy monomer and an epoxy prepolymer corresponding to a material for forming the porous body can be used. Only one type of epoxy monomer and epoxy prepolymer may be used, or two or more types of them may be used in combination. Examples of the epoxy monomer and the epoxy prepolymer include "TETRAD-C (trade name)" manufactured by Mitsubishi Gas Chemical Company, Inc., "TEPIC (trade name)" manufactured by Nissan Chemical Industries, Ltd., and "EPIKOTE 828 (trade name)" manufactured by Mitsubishi Chemical Corporation.

The epoxy monomer and the epoxy prepolymer may be a polyfunctional-epoxy group-containing compound, for example. The epoxy resin may be obtained by polymerizing the epoxy monomer and the epoxy prepolymer with a curing agent, for example. The curing agent may be a polyfunctional-amino group-containing compound, for example. That is, the epoxy resin may be a polymer of a polyfunctional-epoxy group-containing compound and a polyfunctional-amino group-containing compound, for example. Only one type of epoxy monomer and epoxy prepolymer may be used, or two or more types of them may be used in combination. Only one type of curing agent may be used, or two or more types of curing agents may be used in combination.

The polyfunctional-epoxy group-containing compound is an epoxy compound having two or more epoxy groups in one molecule, preferably having three or more epoxy groups, e.g., three or four epoxy groups, in one molecule. By using a polyfunctional-epoxy group-containing compound having three or more epoxy groups in one molecule, for example, it is possible to produce porous epoxy resin particles having a suitable pore diameter and a suitable strength. The polyfunctional-epoxy group-containing compound may be either an aromatic epoxy compound or a non-aromatic epoxy compound, for example. Also, the polyfunctional-epoxy group-containing compound may be either a high molecular weight compound (e.g., an oligomer or a prepolymer) or a low molecular weight compound (e.g., a monomer), for example.

The aromatic epoxy compound may be, for example, a bisphenol A-type epoxy compound, a brominated bisphenol A-type epoxy compound, a bisphenol F-type epoxy compound, a bisphenol AD-type epoxy compound, a stilbene-type epoxy compound, a biphenyl-type epoxy compound, a bisphenol A novolac-type epoxy compound, a cresol novolac-type epoxy compound, diaminodiphenylmethane-type epoxy compound, a polyphenyl-based epoxy compound such as a tetrakis (hydroxyphenyl) ethane-based epoxy compound, a fluorine-containing epoxy compound, or a heteroaromatic ring-containing epoxy compound such as a triazine ring-containing epoxy compound.

The aromatic epoxy compound may be, for example, a bisphenol A-type epoxy compound, a brominated bisphenol A-type epoxy compound, a bisphenol F-type epoxy compound, a bisphenol AD-type epoxy compound, a fluorene-containing epoxy compound, or triglycidyl isocyanurate. Particularly preferably, the aromatic epoxy compound may be a bisphenol A-type epoxy compound, a brominated bisphenol A-type epoxy compound, a bisphenol F-type epoxy compound, a bisphenol AD-type epoxy compound, or a fluorene-containing epoxy compound, each having an epoxy equivalent of 500 or less and a melting point of 100° C. or lower. The aromatic epoxy compound may be N,N, N',N'-tetraglycidyl-m-xylylenediamine (the compound obtained by replacing the cyclohexane ring in the chemical formula (1) shown below by a benzene ring), for example.

The non-aromatic epoxy compound is, for example, an aliphatic glycidyl ether-type epoxy compound, an aliphatic glycidyl ester-type epoxy compound, an alicyclic glycidyl ether-type epoxy compound, or an alicyclic glycidyl ester-type epoxy compound. Preferably, the non-aromatic epoxy compound is an alicyclic glycidyl ether-type epoxy compound, an alicyclic glycidyl ester-type epoxy compound, or the like. Particularly preferably, the non-aromatic epoxy compound is an alicyclic glycidyl ether-type epoxy compound or an alicyclic glycidyl ester-type epoxy compound each having an epoxy equivalent of 500 or less and a melting point of 100° C. or below.

The non-aromatic epoxy compound preferably is an alicyclic epoxy compound having three or more epoxy groups, e.g., three or four epoxy groups, in one molecule, for the reason described above.

The alicyclic epoxy compound having three or more epoxy groups in one molecule is not particularly limited, and an alicyclic epoxy compound having an alicyclic hydrocarbon group and three or more epoxy groups can be used as appropriate. From the viewpoint of further enhancing the hydrophilicity, it is preferable that the alicyclic epoxy compound contains nitrogen atoms. The alicyclic epoxy compound containing nitrogen atoms may be a compound represented by the following chemical formula (A), for example.

In the chemical formula (A), X is an alicyclic hydrocarbon group having 3 to 8 carbon atoms and bound to the nitrogen atom in the formula either directly or via a straight-chain alkylene group having 1 to 5 carbon atoms. Ys may be the same or different from each other, and may each be a hydrogen atom, or an epoxy group bound to the nitrogen atom in the formula either directly or via a straight-chain alkylene group having 1 to 5 carbon atoms. m is 2, 3 or 4 (particularly preferably 2). Y and m are selected in such a manner that three or more epoxy groups are present in the chemical formula (A). The respective "NY$_2$"s may be the same or different from each other.

As described above, X in the chemical formula (A) is an alicyclic hydrocarbon group having 3 to 8 carbon atoms (more preferably 4 to 7, still more preferably 5 to 6) and bound to the nitrogen atom in the formula either directly or via a straight-chain alkylene group having 1 to 5 carbon atoms (more preferably 1 to 3, still more preferably 1). The straight-chain alkylene group that may be present between the nitrogen atom and the alicyclic hydrocarbon group is a methylene group, an ethylene group, a propylene group, or the like, for example. From the viewpoint of preventing deterioration of the mechanical strength of the porous body, it is preferable that the number of carbon atoms in the straight-chain alkylene group does not exceed the above upper limit. Examples of such an X include groups represented by the following formulae (I) to (VI).

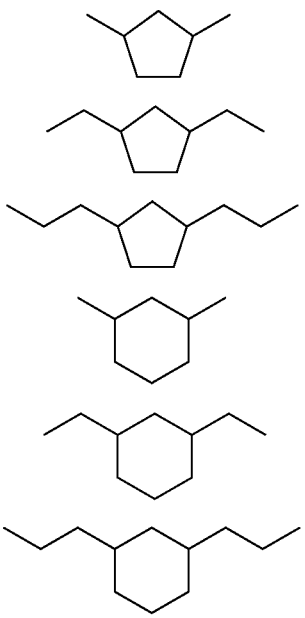

As described above, Y in the chemical formula (A) may be an epoxy group bound to the nitrogen atom in the formula either directly or via a straight-chain alkylene group having 1 to 5 carbon atoms (more preferably 1 to 3, still more preferably 1). The straight-chain alkylene group is not particularly limited, and may be the same as the straight-chain alkylene group described above in connection with X, for example.

As described above, m in the chemical formula (A) is 2, 3, or 4, for example. From the viewpoint of preventing a cross-linking reaction from being inadequate, it is preferable that m is 2 or more. From the viewpoint of preventing a decrease in reactivity caused by steric hindrance, it is preferable that m is 4 or less. As described above, in the respective "NY$_2$"s in the chemical formula (A), Ys may be the same or different from each other, and may each be a hydrogen atom, or an epoxy group bound to the nitrogen atom in the formula either directly or via a straight-chain alkylene group having 1 to 5 carbon atoms. In the respective "NY$_2$"s, it is preferable that at least one Y (preferably, both the two Ys) is the epoxy group. The number of epoxy groups in the chemical formula (A) preferably is not too small from the viewpoint of preventing a cross-linking reaction from being inadequate, and preferably is not too large from the viewpoint of preventing a decrease in reactivity caused by steric hindrance.

Specific examples of the alicyclic epoxy compound having three or more epoxy groups in one molecule include compounds represented by the following chemical formulae (1A) and (1).

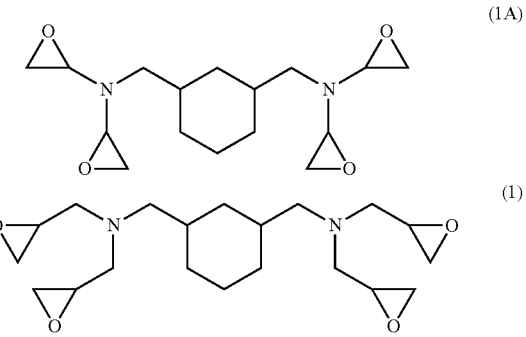

The non-aromatic epoxy compound may be, for example, a compound having an isocyanuric ring, such as "isocyanuric acid triglycidyl", i.e., triglycidyl isocyanurate (2,2,2,-tri-(2,3-epoxypropyl)-isocyanurate), represented by the chemical formula (4) in an example of the present invention to be described below.

From the viewpoint of imparting high hydrophilicity to porous body (e.g., porous epoxy resin particles) of the present invention to be obtained, the polyfunctional-epoxy group-containing compound preferably has nitrogen atoms. In particular, from the viewpoint of compatibility and reactivity with polyfunctional-amino group-containing compounds and the strength of porous epoxy resin particles to be obtained, N,N,N',N'-tetraglycidyl-m-xylylenediamine is preferable. Also, from the viewpoint of high hydrophilicity and broad utility of the raw material, triglycidyl isocyanurate is preferable.

Only one type of polyfunctional-epoxy group-containing compound may be used, or two or more types of polyfunctional-epoxy group-containing compounds may be used in combination.

The polyfunctional-epoxy group-containing compound used as the raw material of the porous body (e.g., porous epoxy resin particles) of the present invention may be either an aromatic amino compound or a non-aromatic amino compound, for example.

Examples of the aromatic amino compound include: aromatic amino compounds such as meta-phenylenediamine, diaminodiphenylmethane, diaminodiphenylsulfone, benzyldimethylamine, and dimethylaminomethylbenzene; aromatic acid anhydrides such as phthalic anhydride, trimellitic anhydride, and pyromellitic anhydride; and amino compounds with a heteroaromatic ring(s) like a triazine ring, such as phenol resins and phenol novolac resins. The aromatic amino compound preferably is an aromatic amino compound having two or more primary amino groups in a molecule, particularly preferably meta-phenylenediamine, diaminodiphenylmethane, or diaminodiphenylsulfone.

Examples of the non-aromatic amino compound include: aliphatic amino compounds such as ethylenediamine, diethylenetriamine, triethylenetetramine, tetraethylenepentamine, iminobispropylamine, bis(hexamethylene)triamine, 1,3,6-trisaminomethylhexane, polymethylenediamine, trimethylhexamethylenediamine, and polyether diamine; alicyclic amino compounds such as isophorone diamine, menthane diamine, N-aminoethylpiperazine, 3,9-bis(3-aminopropyl)2,4,8,10-tetraoxaspiro(5,5)undecane adduct, bis(4-amino-3-methylcyclohexyl)methane, bis(4-aminocyclohexyl)methane, and modifications thereof, and aliphatic polyamide amino compounds each composed of a polyamino compound and a dimer acid.

Among them, from the viewpoint of achieving a crosslinking reaction efficiently, alicyclic amino compounds having two or more primary amino groups in a molecule are preferable. It is more preferable that the non-aromatic amino compound is at least one selected from the group consisting of isophorone diamine, menthane diamine, bis(4-amino-3-methylcyclohexyl)methane, bis(4-aminocyclohexyl)methane, and modifications thereof. Among them, bis(4-amino-3-methylcyclohexyl)methane and bis(4-aminocyclohexyl)methane represented by the chemical formula (2) in an example of the present invention to be described below are particularly preferable. Examples of the modifications of such amines include various modifications such as epoxy modifications, carboxylic acid modifications, urea modifications, modifications with a ketone compound, and modifications with a silane compound, and a modification obtained by modifying any of the above-described alicyclic amino compounds by a known method can be used as appropriate.

Only one type of polyfunctional-amino group-containing compound may be used alone, or two or more types of polyfunctional-amino group-containing compounds may be used in combination.

Further, the porous body raw material may contain, for example, at least one of a monomer and a prepolymer other than an epoxy compound. Examples of the monomer or prepolymer other than the epoxy monomer and the epoxy prepolymer include: aromatic monovinyl compounds such as styrene monomers including styrene, ethyl styrene, methyl styrene, hydroxy styrene, and chloro styrene; (meth)acrylic esters such as methyl (meth)acrylate, ethyl (meth)acrylate, hydroxyethyl (meth)acrylate, hydroxypropyl (meth)acrylate, butyl (meth)acrylate, 2-ethylhexyl (meth)acrylate, cyclohexyl (meth)acrylate, and glycerin mono (meth)acrylate; (meth)acrylamides such as (meth)acrylamide, dimethyl (meth)acrylamide, and hydroxyethyl (meth)acrylamide; nitriles such as (meth)acrylonitrile; epoxy group-containing compounds such as glycidyl (meth)acrylate, 4,5-epoxy butyl (meth)acrylate, and 9,10-epoxy stearyl (meth)acrylate; and monovinyl monomers of other vinyl esters and vinyl ethers. The porous body of the present invention may be the following porous body, for example: porous crosslinked particles obtained by (co)polymerizing one type or two or more types of the porous body raw materials and then imparting a crosslinked structure to the thus-obtained (co)polymer using a crosslinking agent such as epichlorohydrin, (poly)alkylene glycol diglycidyl ether, or alkylene diisocyanate; porous crosslinked particles obtained by (co)polymerizing one type or two or more types of polyvinyl compounds selected from aromatic polyvinyl compounds such as divinylbenzene and trivinylbenzene, poly(meth)acrylic esters such as (poly)ethylene glycol di(meth)acrylic ester and glycerol di(meth)acrylic ester, polycarboxylic acid polyvinyl esters, polycarboxylic acid polyallyl esters, polyol polyvinyl ethers, polyol polyallyl ethers, butadiene, methylenebisacrylamide, and triallyl isocyanurate; or porous crosslinked particles obtained by copolymerizing one type or two or more types of such polyvinyl compounds with one type or two or more types of the above-described monovinyl monomers. From the viewpoint of industrial productivity, it is preferable that the porous particles of the present invention are porous crosslinked particles obtained by copolymerizing one type or two or more types of polyvinyl compounds with one type or two or more types of monovinyl monomers.

The dispersion medium is not particularly limited, and may be an organic solvent or water. Only one type of dispersion medium may be used, or two or more types of dispersion media may be used in combination. Examples of the organic solvent include: hydrocarbon solvents such as hexane, octane, decane, dodecane, isodecane, cyclohexane, methylcyclohexane, toluene, xylene, ethylbenzene, and cumene; alcohol solvents such as methanol, ethanol, propanol, isopropanol, butanol, isobutanol, hexanol, benzyl alcohol, and cyclohexanol; glycol solvents such as ethylene glycol, diethylene glycol, propylene glycol, dipropylene glycol, methyl cellosolve, ethyl cellosolve, butyl cellosolve, propylene glycol monomethyl ether, propylene glycol monoethyl ether, propylene glycol propyl ether, diglyme, triglyme, dipropylene glycol dimethyl ether, butyl carbitol, butyl triethylene glycol, methyl dipropylene glycol, methyl cellosolve acetate, propylene glycol monomethyl ether acetate, dipropylene glycol butyl ether acetate, and diethylene glycol monobutyl ether acetate; ether solvents such as diethyl ether, dipropyl ether, methyl cyclopropyl ether, tetrahydrofuran, dioxane, and anisole; ketone solvents such as methyl ethyl ketone, diethyl ketone, methyl isobutyl ketone, cyclohexanone, isophorone, and acetophenone; ester solvents such as methyl acetate, ethyl acetate, butyl acetate, propyl acetate, methyl butyrate, ethyl butyrate, caprolactone, methyl lactate, and ethyl lactate; halogenated solvents such as chloroform and dichloroethane; amide solvents such as dimethylformamide, dimethylacetamide, pyrrolidone, and N-methylpyrrolidone, and caprolactam; and dimethyl sulfoxide, sulfolane, tetramethylurea, ethylene carbonate, propylene carbonate, dimethyl carbonate, ethyl carbonate, nitromethane, acetonitrile, nitrobenzene, and dioctyl phthalate. Only one type of organic solvent may be used, or two or more types of organic solvents may be used in combination.

The concentration of the porous body raw material in the dispersion is not particularly limited, and is, for example, 0.01 to 10,000 g/l, 1 to 5,000 g/l, or 5 to 3,000 g/l with respect to the dispersion medium.

In the porous body production method according to the present invention, for example, in the dispersion preparation step, the porous body raw material may be dispersed in the dispersion medium together with a dispersant. The concentration of the dispersant is not particularly limited, and is, for example, 1 to 500 g/l, 2 to 300 g/l, or 3 to 250 g/l with respect to the dispersion medium.

The dispersant may be a surfactant, for example. The surfactant is not particularly limited, and is, for example, an anionic surfactant, a cation surfactant, a nonionic surfactant, or a block copolymer composed of a hydrophilic block and a hydrophobic block, such as, for example, a block copolymer composed of a polyacrylic acid block and a polyacrylic ester block, a block copolymer composed of a polyoxyethylene block and a polyacrylic ester block, or a block copolymer composed of a polyoxyethylene block and a polyoxypropylene block.

Examples of the anionic surfactant include fatty acid salts, sulfuric ester salts of higher alcohols, phosphoric ester salts of fatty alcohols, alkyl aryl sulfonate, and formalin condensates of naphthalene sulfonic acid salts. Examples of the cation surfactant include alkyl primary amine salts, alkyl secondary amine salts, alkyl tertiary amine salts, alkyl quaternary ammonium salts, and pyridinium salts. Examples of the nonionic surfactant include polyoxyethylene alkyl ethers, polyoxyethylene alkyl phenylethers, polyoxyethylene alkyl esters, sorbitan alkyl esters, and polyoxyethylene sorbitan alkyl esters. Examples of the high molecular weight surfactant include partially-saponified polyvinyl alcohols, starch, methylcellulose, carboxymethyl cellulose, hydroxyethyl cellulose, and partially-saponified polymatacrylic acid salts.

By selecting a surfactant to be used, it is possible to control the mean particle size, the particle size distribution, and the state of particle agglutination of the porous epoxy resin particles to be obtained. For example, by using an anionic surfactant, a cationic surfactant, or a nonionic surfactant, it is possible to reduce the mean particle size and to narrow the particle size distribution. Also, by using a high molecular weight surfactant, it is possible to increase the mean particle size and to inhibit the particle agglutination. In particular, when a block copolymer composed of a hydrophilic block and a hydrophobic block is used as a surfactant, emulsification can be achieved by adding a small amount of the surfactant. Accordingly, the viscosity of a solution during a polymerization reaction can be kept low, so that the solution can be stirred easily. Thus, it is preferable to use the block copolymer composed of a hydrophilic block and a hydrophobic block as a surfactant.

Only one type of surfactant may be used, or two or more types of surfactants may be used in combination.

The dispersant may be a block copolymer containing a hydrophobic polymer block and a hydrophilic polymer block, for example. In this case, for example, the porous body production method according to the present invention may further include a dispersant production step of producing the dispersant, and the dispersant production step may include: a first living radical polymerization step of forming one of the hydrophobic polymer block and the hydrophilic polymer block by living radical polymerization; and a second living radical polymerization step of forming the other one of the hydrophobic polymer block and the hydrophilic polymer block by living radical polymerization after the first living radical polymerization step. The block copolymer (dispersant) and the dispersant production step will be described in detail in the following [2-2. Block copolymer (dispersant) and dispersant production step] section.

In the dispersion preparation step, the dispersion may contain a component(s) other than the porous body raw material and the dispersant. The other component(s) is not particularly limited. For example, the dispersion may contain a surfactant other than the nonionic surfactant, an antifoaming agent, and/or the like, as long as intended dispersion is not affected by the other component(s).

[2-2. Block Copolymer (Dispersant) and Dispersant Production Step]

The block copolymer (dispersant) and the dispersant production step will be described in detail below.

First, since the block copolymer contains a hydrophobic polymer block and a hydrophilic polymer block, it can be referred to as a "surfactant" in a broad sense, as described above. The block copolymer and the dispersant production step may be the same as those described in JP-A-2015-83688 or may be configured on the basis of or with reference to the descriptions in JP-A-2015-83688, for example. Specifically, the block copolymer and the dispersant production step are as described below, for example.

The block copolymer may be, for example, a diblock copolymer composed of the hydrophobic polymer block (may be referred to simply as "hydrophobic block", "hydrophobic block A", or "A block" hereinafter) and the hydrophilic polymer block (may be referred to simply as "hydrophilic block", "hydrophilic block B", or "B block" hereinafter). The block copolymer may be, for example, a block copolymer obtained by polymerizing addition-polymerizable monomers using: a radical-generating agent; organic iodide as a polymerization initiator compound; and an organic phosphorus compound, an organic nitrogen compound, or an organic oxygen compound as a catalyst.

The content of the A block (hydrophobic block) in the block copolymer molecule is, for example, 5 to 95 mass %, 10 to 90 mass %, 15 to 85 mass %, or 20 to 80 mass %. The content of the B block (hydrophilic block) in the block copolymer molecule is, for example, 5 to 95 mass %, 10 to 90 mass %, 15 to 85 mass %, or 20 to 80 mass %.

Examples of a hydrophobic monomer used as the raw material of the A block (hydrophobic block) include: (meth)acrylates ((meth)acrylic esters) having a hydrophobic group(s); vinyl compounds having a hydrophobic group(s); and allyl compounds having a hydrophobic group(s). Examples of a hydrophilic monomer used as the raw material of the B block (hydrophilic block) include: (meth)acrylates ((meth)acrylic esters) having a hydrophilic group(s); vinyl compounds having a hydrophilic group(s); and allyl compounds having a hydrophilic group(s). For example, the hydrophobic monomer may contain lauryl (meth)acrylate, and the hydrophilic monomer may contain polyethylene glycol methacrylate.

As described above, the dispersant (block copolymer) may have a diblock structure containing a hydrophobic polymer block A and a hydrophilic polymer block B (the dispersant also may be referred to as "A-B diblock polymer" hereinafter). For example, in the dispersion preparation step, the dispersant (block copolymer) is dispersed in the dispersion medium together with the porous body raw material (containing a monomer and/or a prepolymer). When the porous body raw material is relatively more hydrophilic than the dispersion medium, the hydrophilic polymer block B is adsorbed onto the porous body raw material, and surfaces of particles formed by agglutination of the porous body raw material are coated with the hydrophobic polymer block A, for example. As a result, the hydrophobic polymer block A faces the hydrophobic dispersion medium. On the other hand, when the porous body raw material is relatively more hydrophobic than the dispersion medium, the hydrophobic polymer block A is adsorbed onto the porous body raw material, and surfaces of particles formed by agglutination of the porous body raw material are coated with the hydrophilic polymer block B, for example. As a result, the hydrophilic polymer block B faces the hydrophilic dispersion medium. In the above-described manner, the state where the porous body raw material is dispersed in the dispersion medium in the form of particles can be obtained. This state also can be referred to as the state where the porous body raw material is emulsified (suspended) in the dispersion medium, for example. With this configuration, it is possible to improve the dispersion stability of the dispersion before and after polymerization and the storage stability of the dispersion, for example.

The porous body raw material (containing a monomer and/or a prepolymer) is as described above. For example, the porous particle raw material may contain a radical-polymerizable or thermosetting monomer and/or a radical-polymerizable or thermosetting prepolymer. The monomer and prepolymer may be a hydrophilic monomer and a hydrophilic prepolymer, for example.

Next, the production method of the block copolymer (dispersant) may be, for example, a production method in which, as described above, addition-polymerizable monomers (a hydrophobic monomer and a hydrophilic monomer) are polymerized using: a radical-generating agent; organic iodide as a polymerization initiator compound; and an organic phosphorus compound, an organic nitrogen compound, or an organic oxygen compound as a catalyst. Such a production method is described in JP-A-2015-83688, for example. This production method does not have problems of heavy metals, odor, coloration, cost, etc. Specifically, the production method has the following advantages (1) to (6), for example.

(1) The production method does not use any heavy-metal compound; unlike an ATRP method or a DT method, the production method does not use any heavy-metal compound.

(2) Purification is not essential; removal of heavy metals is necessary in the ATRP method and the DT method, and removal of sulfur compounds is necessary in an RAFT method and a MADIX method.

(3) The production method does not require any expensive special compound and can use relatively low cost materials available on the market, and thus can be carried out at low cost; other methods involving living radical polymerization require the use of special compounds.

(4) The production method requires mild polymerization conditions, and can cause polymerization under conditions similar to those in conventional radical polymerization methods; an NMP method has to be carried out at high temperature, and it is necessary to remove oxygen in the ATRP method.

(5) The production method does not require purification of a monomer or a solvent used therein and can use various monomers, and since monomers having various types of functional groups such as acid groups and amino groups can be used, it is possible to introduce various types of functional groups into a polymer block; in particular, an acid group acts as a catalyst poison and thus cannot be used without being treated in the ATRP method, and methacrylate cannot be polymerized successfully according to the NMP method.

(6) The production method can control the molecular weight and structure, so that a block polymer in a desired binding state can be obtained easily. Besides, the production method can attain very high conversion.

It is to be noted that the above explanation is merely illustrative, and in the present invention, the production method of the block copolymer (dispersant) is not particularly limited. That is, the production method of the block copolymer (dispersant) is not limited to the method described in JP-A-2015-83688 only, and may be any production method.

The hydrophobic monomer constituting the A block is not particularly limited, and examples thereof include aliphatic, alicyclic, and aromatic alkyl (meth)acrylates such as methyl (meth)acrylate, ethyl (meth)acrylate, propyl (meth)acrylate, isopropyl (meth)acrylate, butyl (meth)acrylate, 2-methylpropane (meth)acrylate, t-butyl (meth)acrylate, pentyl (meth)acrylate, hexyl (meth)acrylate, octyl (meth)acrylate, 2-ethylhexyl (meth)acrylate, nonyl (meth)acrylate, decyl (meth)acrylate, isodecyl (meth)acrylate, lauryl (meth)acrylate, tetradecyl (meth)acrylate, octadecyl (meth)acrylate, behenyl (meth)acrylate, isostearyl (meth)acrylate, cyclohexyl (meth)acrylate, t-butylcyclohexyl (meth)acrylate, isobornyl (meth)acrylate, 2,2,4-trimethylcyclohexyl (meth)acrylate, cyclodecyl (meth)acrylate, cyclodecylmethyl (meth)acrylate, benzyl (meth)acrylate, t-butyl benzotriazole phenylethyl (meth)acrylate, phenyl (meth)acrylate, naphthyl (meth)acrylate, and allyl (meth)acrylate. In particular, alkyl (meth)acrylates having a long alkyl group, such as lauryl (meth)acrylate, are preferable. Only one type of hydrophobic monomer may be used, or two or more types of hydrophobic monomers may be used in combination.

The hydrophilic monomer constituting the B block is not particularly limited, and may be a monomer having a polyglycol group(s), for example. Specific examples of the monomer having a polyglycol group include: mono(meth)acrylates of polyalkylene glycols, such as poly(n=2 or more)ethylene glycol mono(meth)acrylate, poly(n=2 or more)propylene glycol mono(meth)acrylate, poly(n=2 or more)tetramethylene glycol mono(meth)acrylate, mono (meth)acrylate of a mono or poly(n=2 or more)ethylene glycol mono or poly(n=2 or more)propylene glycol random copolymer, mono(meth)acrylate of a mono or poly(n=2 or more)ethylene glycol mono or poly(n=2 or more)propylene glycol block copolymer; and mono(meth)acrylates of (poly-alkylene)glycol monoalkyls, alkylenes, alkyne ethers and esters, such as (poly)ethylene glycol monomethyl ether (meth)acrylate, (poly)ethylene glycol monooctyl ether (meth)acrylate, (poly)ethylene glycol monolauryl ether (meth)acrylate, (poly)ethylene glycol monostearyl ether (meth)acrylate, (poly)ethylene glycol monooleyl ether (meth)acrylate, (poly)ethylene glycol monostearate ester (meth)acrylate, (poly)ethylene glycol monononyl phenylether (meth)acrylate, (poly)propylene glycol monomethyl ether (meth)acrylate, (poly)propylene glycol monoethyl ether (meth)acrylate, (poly)propylene glycol monooctyl ether (meth)acrylate, (poly)propylene glycol monolauryl ether (meth)acrylate, and (poly)ethylene glycol (poly)propylene glycol monomethyl ether (meth)acrylate. In particular, poly(n=6 or more)ethylene glycol mono(meth)acrylates are desirable. n indicates the degree of polymerization in the polyglycol group. Only one type of hydrophilic monomer may be used, or two or more types of hydrophilic monomers may be used in combination.

The block copolymer (dispersant) may be composed of the hydrophobic polymer block A (A block) and the hydrophilic polymer block B (B block) only, or a component(s) other than the A block and the B block further may be contained (copolymerized) in the block copolymer (dispersant). Examples of a monomer that can be copolymerized without changing the basic properties of the A block and the B block include conventionally known monomers including: vinyl monomers such as styrene, vinyltoluene, vinylhydroxybenzene, chloromethylstyrene, vinylnaphthalene, vinylbiphenyl, vinylethylbenzene, vinyldimethylbenzene, α-methyl styrene, ethylene, propylene, isoprene, butene, butadiene, 1-hexene, cyclohexene, cyclodecene, dichloroethylene, chloroethylene, fluoroethylene, tetrafluoroethylene, acrylonitrile, methacrylonitrile, vinyl acetate, vinyl propionate, isocyanato dimethyl methane isopropenyl benzene, phenylmaleimide, cyclohexylmaleimide, and hydroxymethylstyrene; and hydroxy group-containing monomers such as mono(meth)acrylic esters of alkylene glycol, including 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, cyclohexanedimethanol mono(meth)acrylate, and cyclohexanediol mono(meth)acrylate. Examples of the monomer further include: a polyester mono(meth)acrylic ester obtained by ring-opening polymerization of the above-described (poly)alkylene glycol mono(meth)acrylic ester of (meth)acryloyloxy ethyl mono or poly(n=2 or more)caprolactone or lactone such as ε-caprolactone or γ-butyrolactone; ester (meth)acrylate obtained by reacting the above-described (poly)alkylene glycol mono(meth)acrylic ester of 2-(meth)acryloyloxy ethyl-2-hydroxyethyl phthalate or 2-(meth)acryloyloxy ethyl-2-hydroxyethyl succinate with a dibasic acid to cause half esterification and then reacting the other carboxyl group with an alcohol or alkylene glycol; mono(meth)acrylates of polyfunctional hydroxy group-containing compounds having three or more hydroxy groups, such as glycerol mono(meth)acrylate and dimethylolpropane mono(meth)acrylate; halogen-containing (meth)acrylates such as 3-chloro-2-hydroxypropyl (meth)acrylate, octafluorooctyl (meth)acrylate, and tetrafluoroethyl (meth)acrylate; monomers that absorb ultraviolet rays, such as 2-(4-benzoxy-3-hydroxyphenoxy)ethyl (meth)acrylate and 2-(2'-hydroxy-5-(meth)acryloyloxyethylphenyl)-2H-benzotriazole (these monomers may be copolymerized especially when improvement in light resistance of a dye is desired); and acrylates with their α-positions being substituted by hydroxymethyl, such as ethyl-α-hydroxymethyl acrylate.

The molecular weight of the block copolymer (dispersant) is not particularly limited, and the styrene-equivalent number-average molecular weight determined by gel permeation chromatography (referred to as "GPC" hereinafter) (hereinafter, the term "number-average molecular weight" means the styrene-equivalent number-average molecular weight determined by GPC and may be referred to simply as "molecular weight") is, for example 1,000 or more, 1,500 or more, 2,000 or more, or 3,000 or more, and, for example, 300,000 or less, 100,000 or less, or 50,000 or less. The molecular weight is in the range from, for example, 1,000 to 300,000, preferably 1,500 to 100,000, more preferably 2,000 to 50,000, and still more preferably 3,000 to 50,000. From the viewpoint of the dispersion stability of the porous body raw material in the dispersion medium, it is preferable that the molecular weight of the block copolymer (dispersant) is 1,000 or more. From the viewpoint of the solubility of the block copolymer (dispersant) in the dispersion medium, it is preferable that the molecular weight of the block copolymer (dispersant) is 300,000 or less. If the molecular weight of the block copolymer (dispersant) is too high, the porous body raw material may not be dispersed owing to agglutination of the dispersant and too strong entanglement of molecules of the dispersant in the dispersion medium.

In the block copolymer (dispersant), the polydispersity index (referred to as "PDI" hereinafter), which is the ratio of the weight-average molecular weight to the number-average molecular weight, is not particularly limited. In living radical polymerization, a polymeric dispersant having a very small PDI (up to 1.3) may be used. However, in the present invention, the important thing is that the block copolymer (dispersant) has the above-described block structure, and the PDI is not deeply involved in the present invention. However, when the PDI is too broad, it means that the molecular weight of polymers contained in the block copolymer (dispersant) ranges from large to small, so that phenomena other than the phenomenon that occurs in the above-described molecular weight range may occur. On this account, too broad PDI is not preferable. In the block copolymer (dispersant) used in the present invention, the PDI preferably is 2.0 or less, more preferably 1.8 or less.

Next, the mass ratio between the hydrophobic block and the hydrophilic block in the block copolymer (dispersant) is not particularly limited, and is as described above, for example. By controlling the mass ratio between the hydrophobic block and the hydrophilic block appropriately, the interface between the porous body raw material and the dispersion medium can be maintained in a suitable state in the porous body production method according to the present invention, for example. With this configuration, for example, the state where the porous body raw material is dispersed in the dispersion medium in the form of particles can be maintained, whereby the substantially spherical porous body of the present invention can be produced. Also, by controlling the mass ratio between the hydrophobic block and the hydrophilic block appropriately, the ratio between the hydrophilic substance and the hydrophobic substance can be controlled in a suitable state at the interface between the porous body raw material and the dispersion medium, for example. If either one of the hydrophilic substance and the hydrophobic substance is present disproportionately at the interface, for example, a skin layer may be formed by polymerization or the like of the substance. The through holes on the surface of the porous body are likely to be closed by this skin layer. However, by controlling the ratio between the hydrophilic substance and the hydrophobic substance in a suitable state at the interface, it is possible to prevent the formation of the skin layer. It is to be noted, however, that the above explanations are merely illustrative and do not limit the present invention.

Next, the polymerization method (production method) for obtaining the block copolymer (dispersant) used in the present invention will be described. This polymerization method is not particularly limited, and as described above, it may be a method for polymerizing addition-polymerizable monomers (a hydrophobic monomer and a hydrophilic monomer) using: a radical-generating agent; organic iodide as a polymerization initiator compound; and an organic phosphorus compound, an organic nitrogen compound, or an organic oxygen compound as a catalyst, for example. This polymerization method does not require the use of any metal compound or ligand, and also does not require the use of any special compound such as nitroxide, a dithiocarboxylic acid ester, or xanthate. This polymerization method is living radical polymerization that can be carried out easily merely by additionally using an initiator compound, which is an organic iodide, and a catalyst in radical polymerization that uses conventional addition-polymerizable monomers and a radical-generating agent as a polymerization initiator.

In the polymerization method, the reaction proceeds through a reaction mechanism represented by the following general reaction formula 1. This reaction is considered to be a reversible activation reaction of a dormant species Polymer-X (P-X) to a propagating radical. It is considered that this polymerization mechanism proceeds in the following manner, although the polymerization mechanism may vary depending on the type of the catalyst. In Formula 1, P. generated from a polymerization initiator reacts with XA, whereby a catalyst A. is generated in situ. A. acts as an activator of P—X. By this catalytic action, P—X is activated at a high frequency.

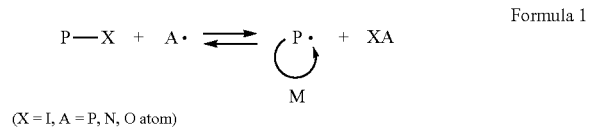

Formula 1

(X = I, A = P, N, O atom)

More specifically, in the presence of an initiator compound having iodine (X) bound thereto, a radical generated from the polymerization initiator abstracts active hydrogen or an active halogen atom in the catalyst to form a catalytic radical A.. Subsequently, this A. abstracts X in the initiator compound to form XA, and the initiator compound then serves as a radical. A monomer polymerizes with the radical, and immediately abstracts X from XA, whereby a termination reaction is prevented. Further, A. abstracts X at the terminus when subjected to heat or the like, whereby XA and the terminal radical are provided. A monomer reacts with the terminal radical to donate X thereto immediately, thereby stabilizing the terminal radical. The polymerization proceeds by repeating the above process, so that the molecular weight and the structure can be controlled. However, in some cases, a side reaction such as a bimolecular termination reaction or disproportionation may occur.

The initiator compound used to initiate the living radical polymerization is not particularly limited, and may be a conventionally known organic iodide. Specific examples of the initiator compound include: methyl iodide, ethyl iodide, propyl iodide, isopropyl iodide, butyl iodide, and t-butyl iodide; alkyl iodides such as iodophenylmethane, iododiphenylmethane, iodotriphenylmethane, 2-iodo-1-phenylethane, 1-iodo-1-phenylethane, 1-iodo-1,1-diphenylethane, and diiodomethane; iodine atom-containing organic halides such as iodo dichloromethane, iodochloromethane, iodotrichloromethane, and iododibromomethane; iodinated alcohols such as 1-iodoethanol, 1-iodopropanol, 2-iodopropanol, 2-iodo-2-propanol, 2-iodo-2-methylpropanol, 2-phenyl-1-iodoethanol, and 2-phenyl-2-iodoethanol; ester compounds of these iodinated alcohols with carboxylic acid compounds such as acetic acid, butyric acid, and fumaric acid; iodinated carboxylic acids such as iodoacetic acid, α-iodopropionic acid, α-iodobutyric acid, α-iodoisobutyric acid, α-iodovaleric acid, α-iodoisovaleric acid, α-iodocaproic acid, α-iodophenylacetic acid, α-iododiphenylacetic acid, α-iodo-α-phenylpropionic acid, α-iodo-β-phenylpropionic acid, β-iodopropionic acid, β-iodobutyric acid, β-iodoisobutyric acid, β-iodovaleric acid, β-iodoisovaleric acid, β-iodocaproic acid, β-iodophenylacetic acid, β-iododiphenylacetic acid, β-iodo-α-phenylpropionic acid, and β-iodo-β-phenylpropionic acid; esterified products of these iodinated carboxylic acids with methanol, ethanol, phenol, or benzyl alcohol, and further, esterified product of these iodinated carboxylic acids with the above-described iodinated alcohols; acid anhydrides of these iodinated carboxylic acids; acid anhydrides of chlorides, bromides, and the like of these iodinated carboxylic acids; and cyano group-containing iodides such as iodoacetonitrile, 2-cyano-2-iodopropane, 2-cyano-2-iodobutane, 1-cyano-1-iodocyclohexane, and 2-cyano-2-iodovaleronitrile. Also, it is possible to use a bifunctional initiator compound having two iodine atoms. Examples of the bifunctional initiator compound include compounds obtained by reacting an iodinated carboxylic acid (such as 1,2-diiodo ethane, 1,2-diiodotetrafluoroethane, 1,2-diiodotetrachloroethane, 1,2-diiodo-1-phenylethane, or the above-described α-iodoisobutyric acid) with a diol such as ethylene glycol or a diamine such as hexamethylenediamine. Although two different Japanese terms are used to indicate "iodo", they should be interpreted as interchangeable with each other and both indicate "iodide". The same applies hereinafter. Only one type of initiator compound may be used, or two or more types of initiator compounds may be used in combination.

As these compounds, commercially available products may be used as they are, or these compounds can be obtained by conventionally known methods, for example. For example, the organic iodide used in the present invention can be obtained by reacting an azo compound such as azobisisobutyronitrile with an iodine, or by causing a halogen exchange reaction of an organic halide containing, instead of iodine in the above-described organic iodides, another halogen atom such as bromide or chloride, using an iodide salt such as quaternary ammonium iodide or sodium iodide. The method for obtaining the organic iodide is not particularly limited.

The catalyst is, for example, an organic phosphorus compound, organic nitrogen compound, or organic oxygen compound that abstracts an iodine atom in the initiator compound to form a radical. Preferably, the catalyst is at least one selected from: organic phosphorus compounds such as halogenated phosphorus/phosphite compounds containing an iodine atom(s) and phosphonate compounds; organic nitrogen compounds such as imide compounds and hydantoin compounds; and organic oxygen compounds such as phenol compounds, iodo oxyphenyl compounds, and vitamins. These compounds are not particularly limited, and specific examples thereof are as follows. The phosphorus compound are halogenated phosphorus/phosphite compounds containing an iodine atom(s) and phosphonate compounds, and examples thereof include dichloroiodophosphorus, dibromoiodophosphorus, phosphorus triiodide, dimethyl phosphite, diethyl phosphite, dibutyl phosphite, diperfluoroethyl phosphonate, diphenyl phosphite, dibenzyl phosphite, bis(2-ethylhexyl)phosphite, bis(2,2,2-trifluoroethyl)phosphite, diallyl phosphite, ethylene phosphite, ethoxyphenyl phosphonate, phenylphenoxy phosphonate, ethoxymethyl phosphonate, and phenoxymethyl phosphonate. The nitrogen compounds are imide compounds and hydantoin compounds, and examples thereof include succinimide, 2,2-dimethylsuccinimide, α,α-dimethyl-β-methylsuccinimide, 3-ethyl-3-methyl-2,5-pyrrolidinedione, cis-1,2,3,6-tetrahydrophthalimido, α-methyl-α-propylsuccinimide, 5-methylhexahydroisoindol-1,3-zione, 2-phenylsuccinimide, α-methyl-α-phenylsuccinimide, 2,3-diacetoxsuccinimide, maleimide, phthalimido, 4-methylphthalimido, N-chlorophthalimido, N-bromophthalimido, N-bromophthalimido, 4-nitrophthalimido, 2,3-naphthalenecarboxyimide, pyromellitdiimide, 5-bromoisoindol-1,3-zione, N-chlorosuccinimide, N-bromosuccinimide, N-iodosuccinimide, hydantoin, and diiodohydantoin. The oxygen compounds are: phenol compounds, which are phenolic hydroxy groups having a hydroxy group on the aromatic ring; iodo oxyphenyl compounds, which are iodides of the phenolic hydroxy groups; and vitamins. Examples thereof include: polymers obtained by polymerizing phenols such as phenol, hydroquinone, methoxyhydroquinone, t-butylphenol, t-butylmethylphenol, catechol, resorcinol, di-t-butylhydroxytoluene, dimethylphenol, trimethylphenol, di-t-butyl-methoxyphenol, and hydroxystyrene; and polymer fine particles carrying the hydroxyphenyl groups thereof. They are added as a polymerization inhibitor for storage of monomers. Thus, a similar effect also can be obtained by using commercially available monomers without purifying them. Examples of the iodo oxyphenyl compounds include thymol diiodide. Examples of the vitamins include vitamin C and vitamin E.

The amount of the catalyst is not particularly limited. For example, the number of moles of the catalyst is less than the number of moles of the polymerization initiator. If the number of moles of the catalyst is too large, there is a risk that the polymerization may be controlled too much to inhibit the proceeding of the polymerization.

Next, the polymerization initiator used in the present invention is not particularly limited, and may be, for example, a conventionally known polymerization initiator used commonly, such as an organic peroxide or an azo compound. Specific examples of the polymerization initiator include benzoyl peroxide, dicumyl peroxide, diisopropyl peroxide, di-t-butyl peroxide, t-butyl peroxybenzoate, t-hexyl peroxybenzoate, t-butylperoxy-2-ethyl hexanoate, t-hexylperoxy-2-ethyl hexanoate, 1,1-bis(t-butylperoxy)3,3,5-trimethyl cyclohexane, 2,5-dimethyl-2,5-bis(t-butylperoxy)hexyl-3,3-isopropyl hydroperoxide, t-butyl hydroperoxide, dicumyl hydroperoxide, acetyl peroxide, bis(4-t-butylcyclohexyl)peroxy dicarbonate, isobutyl peroxide, 3,3,5-trimethyl hexanoyl peroxide, lauryl peroxide, 1,1-bis(t-butylperoxy)3,3,5-trimethyl cyclohexane, 1,1-bis(t-hexylperoxy)3,3,5-trimethyl cyclohexane, 2,2'-azobis(isobutyronitrile), 2,2'-azobis(2,4-dimethylvaleronitrile), 2,2'-azobis(isobutyrate), and 2,2'-azobis(methoxy dimethylvaleronitrile). Only one type of polymerization initiator may be used, or two or more types of polymerization initiators may be used in combination.

The amount of the polymerization initiator to be used is not particularly limited, and may be such that, for example, the number of moles of the polymerization initiator is 0.001 to 0.1 times, more preferably 0.002 to 0.05 times the number of moles of the monomers. When the amount of the polymerization initiator to be used is too small, polymerization may be inadequate. When the amount of the polymerization initiator to be used is too large, the resultant polymer may be composed of the addition-polymerized monomers only.

As described above, by causing polymerization using at least an initiator compound, which is an organic iodide, addition-polymerizable monomers, a polymerization initiator, and a catalyst, it is possible to obtain the block copolymer (dispersant) used in the present invention. Although the polymerization may be bulk polymerization performed without using an organic solvent, it is preferable that the polymerization is solution polymerization performed using a solvent. The organic solvent to be used is not particularly limited as long as it dissolves the organic iodide, the catalyst, the addition-polymerizable monomers, and the polymerization initiator used in the present invention. Examples of the organic solvent include: hydrocarbon solvents such as hexane, octane, decane, isodecane, cyclohexane, methylcyclohexane, toluene, xylene, ethylbenzene, and cumene; alcohol solvents such as methanol, ethanol, propanol, isopropanol, butanol, isobutanol, hexanol, benzyl alcohol, and cyclohexanol; glycol solvents such as ethylene glycol, diethylene glycol, propylene glycol, dipropylene glycol, methyl cellosolve, ethyl cellosolve, butyl cellosolve, propylene glycol monomethyl ether, propylene glycol monoethyl ether, propylene glycol propyl ether, diglyme, triglyme, dipropylene glycol dimethyl ether, butyl carbitol, butyl triethylene glycol, methyl dipropylene glycol, methyl cellosolve acetate, propylene glycol monomethyl ether acetate, dipropylene glycol butyl ether acetate, and diethylene glycol monobutyl ether acetate; ether solvents such as diethyl ether, dipropyl ether, methyl cyclopropyl ether, tetrahydrofuran, dioxane, and anisole; ketone solvents such as methyl ethyl ketone, diethyl ketone, methyl isobutyl ketone, cyclohexanone, isophorone, and acetophenone; ester solvents such as methyl acetate, ethyl acetate, butyl acetate, propyl acetate, methyl butyrate, ethyl butyrate, caprolactone, methyl lactate, and ethyl lactate; halogenated solvents such as chloroform and dichloroethane; amide solvents such as dimethylformamide, dimethylacetamide, pyrrolidone, N-methylpyrrolidone, and caprolactam; and dimethyl sulfoxide, sulfolane, tetramethylurea, ethylene carbonate, propylene carbonate, dimethyl carbonate, ethyl carbonate, nitromethane, acetonitrile, nitrobenzene, and dioctyl phthalate. Only one type of organic solvent may be used, or two or more types of organic solvents may be used in combination.

The monomer concentration is not particularly limited, and is, for example, 5 to 80 mass %, preferably 20 to 60 mass %. From the viewpoint of achieving polymerization smoothly, it is preferable that the monomer concentration is not too low. Also, from the viewpoint of preventing the viscosity of the polymerization solution from being too high to make a stirring operation difficult or to lower the conversion, it is preferable that the monomer concentration is not too high.

The polymerization temperature is not particularly limited, and is 0° C. to 150° C., more preferably 30° C. to 120° C. The polymerization temperature is adjusted according to the half-life of the type of the polymerization initiator. The polymerization time is not particularly limited. Preferably, polymerization is performed until all the monomer units are polymerized. The polymerization time is, for example, 0.5 to 48 hours, and a practical polymerization time preferably is 1 to 24 hours, more preferably 2 to 12 hours.

The atmosphere in which the polymerization reaction is performed is not particularly limited. For example, the polymerization may be performed in the air (in other words, oxygen may be present at an ordinary concentration in a system) or, when necessary, the polymerization may be performed in a nitrogen or argon gas stream in order to remove oxygen. The materials used in the polymerization may be subjected to distillation or a treatment using an active carbon or alumina to remove impurities therefrom. Alternatively, commercially available products may be used as they are. Polymerization may be performed under light shielding conditions. Also, there is no problem to perform polymerization in a transparent container such as a glass container.

The operation procedure and mechanism of the production method (polymerization method) of the block copolymer (dispersant) are, for example, as described below. First, using a monofunctional organic iodide as an initiator compound, an addition-polymerizable monomer having at least an acid group(s) is polymerized by the above-described method to obtain one polymer block (referred to as "A block"). The terminus of this polymer is stabilized by being substituted with an iodine group. Thus, it is possible to start polymerization again by adding a monomer again and applying heat or the like to cause dissociation or by further adding a small amount of a radical initiator.

The thus-obtained A block is collected and purified, and is dissolved in the organic solvent again. Using this A block as an initiator compound, polymerization is caused by adding a subsequent monomer (preferably also adding a catalyst and a polymerization initiator). As a result, iodine at the terminus of the polymer is dissociated, whereby polymerization starts again. Thus, a diblock polymer composed of the A block and the B block bound to each other can be obtained. The block copolymer (dispersant) also can be obtained by, after the formation of the A block, adding a B block monomer (preferably also adding the catalyst and the polymerization initiator) without taking out the polymer to perform polymerization.

The A-B diblock polymer (the block copolymer) may be obtained in the same manner by generating the blocks in reverse order, namely, by polymerizing the B block monomer to form a hydrophilic polymer first and then polymerizing a monomer containing at least a monomer unit(s) having a hydrophobic group(s).

In the polymerization used in the present invention, the molecular weight of a polymer can be controlled by adjusting the amount of an initiator compound, for example. More specifically, for example, by setting the number of moles of a monomer relative to the number of moles of the initiator compound, it is possible to control the molecular weight to any desired value or to roughly control the size of the molecular weight. For example, when polymerization is caused using 1 mol of an initiator compound and 500 mol of a monomer with a molecular weight of 100, the theoretical molecular weight of the resultant polymer is 1×100× 500=50,000. That is, the set molecular weight can be calculated according to the following formula.

[1 mol of initiator compound×molecular weight of monomer×molar ratio of the initiator compound to the monomer]

However, the polymerization method used in the present invention may involve a side reaction such as bimolecular termination or disproportionation, so that the above-described theoretical molecular weight may not be obtained. Although it is preferable to obtain a polymer without causing these side reactions, the molecular weight may be increased as a result of coupling or may be decreased as a result of termination. Further, the conversion does not have to be 100%. The remaining monomer may be removed by evaporation or may be removed at the time of precipitating the block polymer. Alternatively, after the desired block polymer is obtained, polymerization of the remaining monomer may be completed by adding a polymerization initiator and a catalyst. The polymerization method is not limited as long as the diblock polymer used in the present invention is generated or contained in the reaction product. Also, there is no problem if the respective block polymer units are contained in the reaction product. The block copolymer (dispersant) preferably contains at least 50 mass %, more preferably at least 80 mass % of the block polymer of the present invention. Although the above-described side reactions result in broader PDI, the PDI is not particularly limited, and preferably is 2.0 or less, more preferably 1.8 or less.

By causing polymerization using at least addition-polymerizable monomers, a polymerization initiator, and a catalyst with an organic iodide as an initiator compound as described above, it is possible to obtain a diblock polymer, which is the block copolymer (dispersant) used in the present invention.

It is to be noted, however, that, as described above, this production method (polymerization method) may be selected freely, and the block copolymer (dispersant) used in the present invention may be produced by any method.

[2-3. Production of Porous Body by Polymerization]

The porous body production method according to the present invention can be carried out specifically in the following manner, for example. In the following, an example where the production method uses a porous body raw material containing a thermosetting monomer and/or a thermosetting prepolymer will be described mainly. In particular, an example where the porous body raw material contains an epoxy monomer and/or an epoxy prepolymer as the thermosetting monomer and prepolymer will be described. It should be noted that, as described above, the porous body raw material is not limited to the following examples, and may be selected freely.

First, a dispersion is prepared by dispersing a porous body raw material containing a monomer and/or a prepolymer in a dispersion medium to which the block copolymer (dispersant) has been added previously (the dispersion preparation step). The porous body raw material is as described above. The dispersion preparation step specifically is performed by, for example, mixing a thermosetting composition containing at least a solvent serving as a porogen with a hydrophobic organic solvent (dispersion medium) to which the block copolymer (dispersant) has been added previously to disperse the thermosetting composition in the hydrophobic organic solvent in the form of particles. The thermosetting composition (porous body raw material) is, for example, an epoxy resin raw material composition containing an epoxy resin raw material (an epoxy monomer and/or an epoxy prepolymer), a curing agent, and a porogen. Thereafter, the polymerization step is performed by heating the dispersion, for example. In the polymerization step, a porous epoxy resin body is obtained through polymerization (curing). Thereafter, the porogen, the solvent, the unreacted substances, and the like are removed from the porous body (particulate cured product), when necessary.

The epoxy monomer and epoxy prepolymer as the raw material are as described above. Among the above-described epoxy monomers and epoxy prepolymers, epoxy monomers and epoxy prepolymers having an epoxy equivalent of 600 or less and dissolvable in a porogen are particularly preferable.

The curing agent used in the porous body production method of the present invention is not particularly limited, and examples thereof include amines, polyamideamines, acid anhydrides, and phenol curing agents as described above. Among the above-described curing agents, polyfunctional-amino group-containing compounds are as described above, for example. More specifically, examples of the polyfunctional-amino group-containing compounds include meta-phenylenediamine, diaminodiphenylmethane, diaminodiphenylsulfone, bis(4-amino-3-methylcyclohexyl) methane, bis(4-aminocyclohexyl)methane, and aliphatic polyamideamines each composed of a polyamine and a dimer acid. In the present invention, it is preferable to use a curing agent that can react with an epoxy resin to form a hydroxy group, thereby imparting hydrophilicity to a porous material to be obtained or a curing agent that has a function of chemically modifying the porous material afterward.

In the porous body production method according to the present invention, a curing accelerator also may be used. The curing accelerator is not particularly limited, and may be any known compound as described above. Examples of the curing accelerator that can be used suitably include: tertiary amines such as triethylamine and tributylamine; imidazoles such as 2-phenol-4-methylimidazole, 2-ethyl-4-methylimidazole, and 2-phenol-4,5-dihydroxymethylimidazole; and strong bases such as DBU and DBN.

As described above, the thermosetting composition (porous body raw material) includes, for example, an epoxy compound (e.g., at least one of an epoxy monomer and an epoxy prepolymer) and a curing agent, and may further include a curing accelerator, a porogen, and the like. This thermosetting composition (porous body raw material) can be prepared, for example, by mixing the epoxy compound and the curing agent into the curing accelerator and the porogen to be homogenized.

The contents of the epoxy resin raw material (for example, polyfunctional-epoxy group-containing compound) and the curing agent (for example, a polyfunctional phenol resin) in the thermosetting composition preferably are set so that, with respect to 1 equivalent of the phenolic hydroxyl group in the curing agent, 1.1 to 4 equivalents, in particular, 1.5 to 3 equivalents of the epoxy group in the epoxy resin raw material is present, for example. For example, by setting the equivalent ratio of the epoxy resin raw material so as to be not less than the lower limit, a porous epoxy resin to be obtained can have an improved crosslinking density and thus tends to exhibit improved mechanical strength, heat resistance, solvent resistance, etc. On the other hand, by setting the equivalent ratio of the epoxy resin raw material so as to be not more than the upper limit, the amount of unreacted curing agent can be reduced and the curing agent can be prevented from remaining in the porous epoxy resin in an unreacted state. Thus, the crosslinking density tends to be improved.

The content of the solvent serving as a porogen in the thermosetting composition affects the pore diameter, the pore distribution, etc. of porous epoxy resin particles to be obtained, for example. When the content of the porogen is high, the porous epoxy resin particles tend to have a large pore diameter. On the other hand, when the content of the porogen is low, the porous epoxy resin particles tend to have a small pore diameter. Further, when the content of the porogen is high, the porous epoxy resin particles tend to exhibit broad pore distribution. On the other hand, when the content of the porogen is low, the porous epoxy resin particles tend to exhibit sharp pore distribution.

The content of the solvent serving as a porogen in the thermosetting composition generally is set so that the amount of the solvent is preferably 50 to 500 wt %, more preferably 100 to 400 wt % with respect to the total amount of a polyfunctional-epoxy group-containing compound and a polyfunctional-amino group-containing compound contained in the thermosetting composition. When the content of the porogen is not less than the lower limit, a pore structure with a higher porosity can be formed. On the other hand, when the content of the porogen is not more than the upper limit, the porosity of the porous epoxy resin to be obtained can be controlled so as to be in a suitable range, so that the porous epoxy resin tends to have improved mechanical strength.

The thermosetting composition may further contain a curing accelerator as described above. The curing accelerator is not particularly limited, and examples thereof are as described above.

The thermosetting composition may further contain a reaction raw material compound(s) other than the epoxy resin raw material and the curing agent. A reaction raw material compound that can be used in an addition polymerization reaction together with the epoxy resin raw material and the curing agent is not particularly limited as long as, for example, it can be addition-polymerized together with the epoxy resin raw material and the curing agent. For example, as the reaction raw material compound(s), one type or two or more types of monomers and prepolymers given above as examples of the polymer raw material other than epoxy resins can be used. In order to obtain the intrinsic characteristics of the porous epoxy resin, such as the impact resistance, chemical resistance, durability, handleability, and productivity, effectively, the amount of the reaction raw material compound(s) other than the epoxy resin raw material and the curing agent preferably is 30 wt % or less, particularly preferably 0 to 15 wt %, with respect to the total amount of all the reaction raw material compounds. In addition, a non-reactive raw material compound other than the epoxy resin raw material and the curing agent may be mixed into the thermosetting composition to use. For example, when fine powder silica having a primary particle diameter of several nm to several ten nm is added and thickened, an effect of reducing the formation of a skin layer having no pores on the surface of the polymer is obtained.

The method for preparing the thermosetting composition is not particularly limited, and the following method may be employed: mixing a polyfunctional-epoxy group-containing compound, a polyfunctional-amino group-containing compound, and a porogen together at an ordinary temperature or while heating; or adding a mixture of a polyfunctional-epoxy group-containing compound and a polyfunctional-amino group-containing compound to a porogen, and then mixing them together or dissolving the mixture in the porogen at an ordinary temperature or while heating.

Next, in the dispersion preparation step, the porous body raw material (thermosetting composition) can be dispersed in the form of particles by stirring the dispersion medium while applying sufficient shear force, for example. In this case, a suitable method can be selected in consideration of the size of the particles and the particle size distribution. For example, the method for dispersing the porous body raw material (thermosetting composition) may be a method that can apply sufficient shear force. More specifically, for example, it is possible to use not only devices with stirring blades in various shapes (such as propeller-type, paddle-type, turbine-type, or screw-type stirring blades) but also known methods such as the use of a planetary centrifugal mixer or a "vortex mixer" that stirs liquid contained in a test tube by rotating the bottom of the test tube at a high speed, stirring utilizing ultrasonic waves, or a membrane emulsification method. It is preferable to select a method that can provide uniform particle diameters to the extent possible.

In the dispersion preparation step, as described above, the thermosetting composition may be mixed with a hydrophobic organic solvent (dispersion medium) to which the block copolymer (dispersant) has been added previously to disperse the thermosetting composition in the hydrophobic organic solvent in the form of particles, for example. In the hydrophobic organic solvent (dispersion medium) to which the block copolymer (dispersant) has been added previously, the concentration of the block copolymer (dispersant) is not particularly limited, and is, for example, 1 to 500 g/l, 2 to 300 g/l, or 3 to 250 g/l, as described above. By setting the concentration of the block copolymer so as to be not less than the lower limit, the particle diameter can be controlled easily and agglutination during the polymerization can be inhibited. On the other hand, by setting the concentration of the block copolymer so as to be not more than the upper limit, it is possible to inhibit the occurrence of foaming and the increase in viscosity during the polymerization, so that the porous particles can be produced easily. Then, as described above, in the state where the thermosetting composition is dispersed in the hydrophobic organic solvent in the form of particles, i.e., in the state where water-in-oil type emulsion is formed, a subsequent polymerization step can be performed.

In the polymerization step of polymerizing the porous body raw material in the dispersion, the amount of the dispersant (e.g., the block copolymer or surfactant) to be used is not particularly limited, and may be about 1 to 20 wt % or about 2 to 10 wt % with respect to the total amount of the epoxy resin raw material, the curing agent, and the porogen, for example. The amount of the dispersant to be used affects the mean particle size and the particle size distribution of the porous body to be obtained and particle agglutination, for example. When the amount of the dispersant to be used is large, it is possible to control the mean particle size and the particle size distribution of the porous body to be obtained and particle agglutination. When the amount of the dispersant to be used is small, the degree of foaming and the viscosity tend to be kept low. Thus, by setting the amount of the dispersant to be used so as to be not less than the lower limit, the raw material mixture can be emulsified uniformly, so that it is possible to limit the particle size distribution in a narrow range and also to inhibit particle agglutination. On the other hand, by setting the amount of the dispersant so as to be not more than the upper limit, it is possible to inhibit the occurrence of foaming and the increase in viscosity, so that the porous body can be produced easily.

In the polymerization step, the reaction temperature is not particularly limited, and can be set as appropriate. The reaction temperature is determined basically depending on the combination of an epoxy resin and a curing agent, and is, for example, 20° C. to 250° C., 40° C. to 220° C., or 50° C. to 200° C., while it may vary depending on the stirring speed, the amounts of the porogen and the surfactant to be used, etc. The heating temperature affects the pore diameter of the porous body to be obtained, for example. When the heating temperature is high, the porous body to be obtained tends to have a small pore diameter. When the heating temperature is low, the porous body to be obtained tends to have a large pore diameter. When the heating temperature is moderately high, an addition polymerization reaction proceeds smoothly. When the heating temperature is moderately low, the reaction velocity can be prevented from being too high, so that the pore structure can be formed successfully.

In the polymerization step, the reaction time also is not particularly limited, and can be set as appropriate. The reaction time is, for example, 0.01 to 100 hours, 0.05 to 24 hours, or 0.1 to 20 hours, while it may vary depending on the stirring speed, the heating temperature, the amounts of the porogen and the surfactant used, etc. The reaction time affects the reaction rate of the porous body to be obtained, for example. When the reaction time is long, the amount of unreacted substances is small owing to a high reaction rate, so that the porous body tends to have high mechanical strength. When the reaction time is short, the amount of unreacted substances is large owing to a low reaction rate, so that the porous body tends to have low mechanical strength. When the reaction time is moderately long, an addition polymerization reaction proceeds sufficiently, thus allowing a desired pore structure to be formed. When the reaction time is moderately short, it is possible to reduce the risk of fracture etc. caused by stirring.

In the polymerization step, it is preferable to perform the reaction while stirring the dispersion. The stirring speed is not particularly limited, and is, for example, 10 to 20,000 rpm, 30 to 10,000 rpm, 50 to 5,000 rpm, 50 to 800 rpm, or 100 to 400 rpm, while it may vary depending on the heating temperature, the reaction scale, the amounts of the porogen and the surfactant to be used, etc. The "rpm" stands for revolutions per minute. The stirring speed affects the particle size of the porous body to be obtained, for example. In general, when the stirring speed is high, the porous body to be obtained tends to have a small particle size, and when the stirring speed is low, the porous body tends to have a large particle size. When the stirring speed is moderately high, the phase separation etc. are inhibited, so that porous particles with a uniform particle size can be obtained. When the stirring speed is moderately low, it is possible to prevent the particle size from being too small and also to inhibit the occurrence of foaming.

After the completion of the polymerization step, the porogen, the solvent, the unreacted substances, and the like are removed from the porous body (particulate cured products), when necessary, as described above. Specifically, for example, the dispersion medium containing the porous particles is washed sufficiently by repeating an operation of diluting the dispersion medium with a large amount of a washing solvent and separating the settling particles by centrifugation, and thereafter, the washing solvent is removed using a vacuum dryer. The washing solvent preferably is a solvent that is highly soluble in the dispersion medium and the porogen or a solvent that has a low boiling point and thus can be removed easily. Specific examples of the washing solvent include tetrahydrofuran. In this manner, the porous body of the present invention can be obtained. As described above, the material of the porous body of the present invention is not particularly limited. For example, in the case of forming a porous body using a material other than thermosetting resins, a porous body raw material corresponding to the material of the porous body may be used instead of the porous body raw material containing a thermosetting monomer and/or a thermosetting prepolymer, and it is not necessary to use a porogen or a curing agent.

The produced porous body may be subjected to surface modification or the like by a physical or chemical treatment, for example. The physical or chemical treatment may be carried out for the purpose of improving the properties of the porous body as a separating agent for chromatography, for example. Examples of the physical or chemical treatment include surface hydrophilization, surface hydrophobization, and introduction of a functional group(s). For example, as described above, the porous body of the present invention contains no primary to tertiary amino groups or contains no nitrogen atom to be quaternized by acid treatment, so that the amino group or the nitrogen atom can be suppressed or prevented from hindering the introduction of the functional group (surface treatment).

[3. Shape, Use (Usage), Etc. of Porous Body]

The shape and size of the porous body of the present invention are not particularly limited. The porous body of the present invention may be, for example, a porous particle as described above. Further, the porous particle may be, for example, a substantially spherical particle. The shape and size of the porous body of the present invention are not limited thereto and can be any shape or size, and the porous body may be, for example, a bulk body or a thin film. For example, as described above, since the porous body raw material before polymerization is a liquid (e.g., a solution, a dispersion, or the like), a free shape can be formed by polymerization in an appropriate mold. For example, the porous body of the present invention can be produced in various shapes. When the porous body of the present invention is produced in a shape of a square as a bulk, a column, or a cylinder in a HPLC column, an integral filler having uniform porosity can be obtained, when the porous body is produced between flat plates such as glass plates, the porous body in the shape of a thin film can be obtained, and when the porous body is produced by emulsion polymerization or dispersion polymerization in a hydrophobic solvent, the porous body in the shape particle can be obtained. It is also possible to combine with reinforcing materials such as glass fibers, cellulose nanofibers, carbon fibers, nonwoven fabrics and Japanese paper, for example.

The use of the porous body of the present invention is not particularly limited. For example, the porous body of the present invention is very useful as a novel adsorptive separating agent. More specifically, the porous body of the present invention, which is a porous particle can be used as a separating agent for chromatography, for example. Examples of a target substance to be separated by chromatography include: biological substances such as proteins, peptides, amino acids, and nucleic acids; and other chemical substances. The use of the porous particle of the present invention is not limited thereto. For example, the porous particle of the present invention is applicable to various uses, and can be used as, for example, fillers for use in cosmetics, fillers for use tires, fillers for use in paint and ink, excipients for sustained-release drugs, fillers for use in column reactors carrying a reaction catalyst, disinfectants, and battery separators. For example, when the porous body is used as a battery separator, a porous body of the present invention in the form of a thin film may be used, or for example, a porous body of the present invention in the form of a porous particle may be coated on the surface of an electrode to form a battery separator.

EXAMPLES

Examples of the present invention will be described below. It is to be noted, however, that the present invention is by no means limited to the following examples.

Synthesis Examples: Synthesis of A-B Block Copolymer (Dispersant)

In the manners described in the following Synthesis Examples 1 to 2, A-B block copolymers (dispersants) each composed of a hydrophobic polymer block A and a hydrophilic polymer block B were produced (synthesized). Monomers composing these block copolymers were all (meth)acrylate monomers. The A-chain polymer block was composed of (meth)acrylate having a hydrophobic group, and the B-chain polymer block was composed of (meth)acrylate having a hydrophilic group. These block copolymers each had a polystyrene-equivalent number-average molecular weight determined by GPC of 2,000 to 100,000 and had a PDI of 1.6 or less. In each of the block copolymers, the polymer block A composed of the (meth)acrylate having a hydrophobic group had a number-average molecular weight of less than 80,000, and the amount of the polymer block A was 20 to 98 mass % of the total amount of all the components. Unless otherwise stated, parts of each substance given below mean parts by mass (parts by weight).

Synthesis Example 1

To a reaction vessel having a stirrer, a reflux condenser, a thermometer, and a nitrogen inlet tube attached thereto, 5.23 parts of toluene, 5 parts of laurylmethacrylate (abbreviated as "LMA" hereinafter), 0.0495 parts of iodine, 0.909 parts of 2,2'-azobis(4-methoxy-2,4-dimethylvaleronitrile) (abbreviated as "V-70" hereinafter) as a polymerization initiator, 0.0183 parts of azobisdimethylvaleronitrile (abbreviated as "V-65" hereinafter), and 0.0726 parts of tetrabutylammonium iodide (abbreviated as "BNI" hereinafter) were added, and the resultant mixture was stirred at 60° C. while supplying nitrogen. Polymerization was allowed to proceed for 16 hours, whereby a polymer block A was obtained. A sample was extracted from the polymer block A, and the solid content in the sample was measured. The polymerization conversion calculated from the nonvolatile content was 90%. The number-average molecular weight (abbreviated as "RI-Mn" hereinafter) measured by a differential refractometer of a GPC apparatus at this time was 16,500, and the PDI was 1.27.

Next, 2.33 parts of toluene, 9.34 parts of polyethylene glycol methacrylate (abbreviated as "PEGMA" hereinafter), and 0.121 parts of V-70 were added, and polymerization was allowed to proceed for 3 hours at the same temperature as in the above (60° C.), whereby a B-chain was formed. The B-chain had a number-average molecular weight of 2,100, a PDI of 1.28, and a polymerization conversion of 87%. In the above-described manner, an A-B block copolymer solution was obtained. This polymerization solution was dissolved in tetrahydrofuran having substantially the same weight as the polymerization solution, and then precipitated with a large amount of methanol. After allowing the resultant mixture to stand still for a while, the supernatant was removed, and the remaining mixture was centrifuged. Thereafter, the obtained precipitate was subjected to the same step as described above (dissolved in tetrahydrofuran and precipitated with methanol) twice, and the obtained precipitate was then dried. As a result, a A-B block copolymer (dispersant) in a semi-liquid state was obtained. The yield was 41%. The thus-obtained A-B block copolymer had a number-average molecular weight of 18,700 and a PDI of 1.27. The block copolymer (dispersant) of the present synthesis example (Synthesis Example 1) obtained in the above-described manner is referred to as "block copolymer K-1" hereinafter.

Synthesis Example 2

To a reaction vessel having a stirrer, a reflux condenser, a thermometer, and a nitrogen inlet tube attached thereto, 5.23 parts of toluene, 3 parts of laurylmethacrylate (abbreviated as "LMA" hereinafter), 0.0495 parts of iodine, 0.909 parts of 2,2'-azobis(4-methoxy-2,4-dimethylvaleronitrile) (abbreviated as "V-70" hereinafter) as a polymerization initiator, 0.0183 parts of azobisdimethylvaleronitrile (abbreviated as "V-65" hereinafter), and 0.0726 parts of tetrabutylammonium iodide (abbreviated as "BNI" hereinafter) were added, and the resultant mixture was stirred at 60° C. while supplying nitrogen. Polymerization was allowed to proceed for 16 hours, whereby a polymer block A was obtained. A sample was extracted from the polymer block A, and the solid content in the sample was measured. The polymerization conversion calculated from the nonvolatile content was 90%. The number-average molecular weight (abbreviated as "RI-Mn" hereinafter) measured by a differential refractometer of a GPC apparatus at this time was 9800, and the PDI was 1.19.

Next, 2.33 parts of toluene, 4.0 parts of polyethylene glycol methacrylate (abbreviated as "PEGMA" hereinafter), and 0.121 parts of V-70 were added, and polymerization was allowed to proceed for 3 hours at the same temperature as in the above (60° C.), whereby a B-chain was formed. The B-chain had a number-average molecular weight of 900, a PDI of 1.27, and a polymerization conversion of 88%. In the above-described manner, an A-B block copolymer solution was obtained. This polymerization solution was dissolved in tetrahydrofuran having substantially the same weight as the polymerization solution, and then precipitated with a large amount of methanol. After allowing the resultant mixture to stand still for a while, the supernatant was removed, and the remaining mixture was centrifuged. Thereafter, the obtained precipitate was subjected to the same step as described above (dissolved in tetrahydrofuran and precipitated with methanol) twice, and the obtained precipitate was then dried. As a result, a A-B block copolymer (dispersant) in a semi-liquid state was obtained. The yield was 42%. The thus-obtained A-B block copolymer had a number-average molecular weight of 10,700 and a PDI of 1.22. The block copolymer (dispersant) of the present synthesis example (Synthesis Example 1) obtained in the above-described manner is referred to as "block copolymer K-2" hereinafter.

The porous particles of the present invention were produced in the following respective examples.

Example 1

<Preparation Step of Dispersion of Porous Body Raw Material>

To a glass No. 5 sample tube bottle (volume: 20 ml), 2.75 g of PEG200, 1.0 g of EHPE3150 (trade name of Daicel Corporation, represented by the following chemical formula (E1), n=10 to 15, 1,2-epoxy-4-(2-oxylanyl)cyclohexanoic adduct of 2,2-bis(hydroxymethyl)-1-butanol), 0.35 g of DL-92 (curing agent, represented by the following chemical formula (F1), n=about 3 to 10, manufactured by Meiwa Plastic Industries, Ltd.), and 0.15 g of PEG10000 were uniformly dissolved at 80° C., and then 0.06 g of 2-Methylimidazole (curing accelerator) was added to sufficiently dissolve into a uniform state, thereby preparing a dispersion (polymerization liquid) of a porous body raw material.

<Polymerization Step>

By allowing the polymerization liquid to stand in a constant temperature bath at 120° C. for 1 hour, a polymerization step of polymerizing the porous body raw material in the dispersion was performed. The resulting polymer together with a sample tube was immersed in a water tank for two days to replace water-soluble components (PEG200, PEG10000) in the polymer with water, thereby removing the water-soluble components. During this time, the water in the sample tube bottle was changed with fresh water appropriately. Thereafter, the sample tube was taken out from the water tank, and the porous body in the sample tube was sufficiently dried in an air blowing dryer, thereby obtaining a white porous epoxy resin body of the present example. The obtained porous body had an interconnected pore structure in which holes communicate with each other. A skin layer having few pores was formed thinly on the surface of the porous body. The through holes inside the porous body are through holes formed by spinodal decomposition in the polymerization step. FIG. 1 shows the SEM photograph thereof.

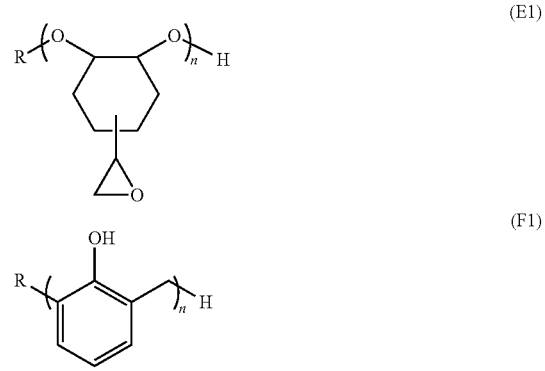

Example 2

The porous body of the present embodiment was produced in the same manner as in Example 1 except that a part of EHPE3150 of Example 1 was replaced with TETRAD-C (trade name of Mitsubishi Gas Chemical Company, Inc.) in such a manner that the mole content of the epoxy group is the same.

Example 3

The porous body of the present embodiment was produced in the same manner as in Example 1 except that the curing accelerator of Example 1 was replaced with DBU.

Example 4

The porous body of the present embodiment was produced in the same manner as in Example 1 except that the curing agent of Example 1 was replaced with MEH-7500 (trade name of Meiwa Plastic Industries, Ltd., triphenyl-methane-type phenol resin).

Comparative Example 1

A bulk-like resin was produced in the same manner as in Example 1 except that H-4 (trade name of Meiwa Plastic Industries, Ltd.) was used instead of DL-92 as a curing agent. The obtained resin did not have an interconnected pore structure in which holes communicate with each other.

Comparative Example 2

A bulk-like resin was produced in the same manner as in Example 1 except that TETRAD-C (trade name of Mitsubishi Gas Chemical Company, Inc.) was used instead of EHPE-3150 as an epoxy compound. The obtained resin did not have an interconnected pore structure in which holes communicate with each other.

Comparative Example 3

<Preparation Step of Dispersion of Porous Body Raw Material>

To a glass No. 5 sample tube bottle (volume: 20 ml), 4.0 g of PEG200, 1.0 g of TETRAD-C which is a glycidylamine-type epoxy compound, and 0.32 g of BACM (reagent, trade name of Wako Pure Chemical Industries, Ltd.) as an amine-type curing agent were uniformly dissolved at 60° C., thereby preparing a dispersion (polymerization liquid) of a porous body raw material.

<Polymerization Step>

Polymerization was carried out by allowing the polymerization liquid to stand in a constant temperature bath at 110° C., the resulting polymer together with a sample tube was immersed in a water tank for two days to replace water-soluble components (PEG200, PEG10000) in the polymer with water, thereby removing the water-soluble components. During this time, the water in the sample tube bottle was changed with fresh water appropriately. Thereafter, the sample tube was taken out from the water tank, and the monolith in the sample tube was sufficiently dried in an air blowing dryer, thereby obtaining a white porous epoxy resin body. The obtained porous body had an interconnected pore structure in which holes communicate with each other. A skin layer having few pores was formed thinly on the surface of the porous body. The through holes inside the porous body are through holes formed by spinodal decomposition in the polymerization step.

[Method for Measuring Water Resistance, Acid Resistance, and Alkali Resistance]

The porous bodies of Examples 1 to 4 and the epoxy resins of Comparative Examples 1 to 3 were each made into a cube having a size of about 5 mm, and then the cube was immersed in an aqueous solution of pure water of ordinary temperature (25° C.), 1 mole hydrochloric acid, and caustic soda and left for 24 hours. The size (length) of the largest side of each sample was measured with a caliper before and after immersion, and the ratio (length) to before immersion was expressed in %. The case without shrinkage or swelling was set as 100% (length). The results are shown in Table 1 below.

Example 5: Particle 1

<Preparation of Epoxy Monomer Composition (Dispersion)>

As a dispersed phase, 27.5 parts by weight of polyethylene glycol 200 (manufactured by Wako Pure Chemical Industries, Ltd.) and 1.25 parts by weight of polyethylene glycol 10000 (manufactured by Wako Pure Chemical Industries, Ltd.), 10.0 parts by weight of epoxy compound (trade name: EHPE3150, manufactured by Daicel Corporation) having an epoxy equivalent of 170 to 190 (average: 180), 3.2 parts by weight of phenol novolac (curing agent, manufactured by Meiwa Plastic Industries, Ltd.), and 0.55 parts by weight of 2-methylimidazole (curing accelerator, manufactured by Wako Pure Chemical Industries, Ltd.) were heated to 80° C. in a 100-ml four-necked flask and stirred to prepare a homogeneous solution (dispersion).

<Polymerization Step and after Treatment>

As a continuous phase, 2.4 g of block polymer K-2 (polylauryl methacrylate (Mn=9200, PDI=1.17)-b-polypolyethylene glycol methacrylate (Mn=900) (whole block polymer Mn=10700, PDI=1.22, solid content concentration 99%)) was mixed and sufficiently dissolved in 40.0 g of Dodecane (manufactured by Wako Pure Chemical Industries, Ltd.) at 80° C. in a 200-ml flask, the total amount of the dispersed phase was added thereto and emulsified and dispersed for 5 minutes at 400 rotations/min, the rotational speed was then set to 50 rotations/min and the temperature was raised to 120° C. to polymerize for 1 hour, thereby obtaining porous epoxy particles.

The porous epoxy particles obtained by polymerization were placed in MEK (methyl ethyl ketone) and sufficiently stirred, and then the particles were separated by centrifugation. This washing step with MEK was repeated 10 times to

TABLE 1

| | | Molecular weight (polymerization degree) | Functional group equivalent | Ex. 1 | Ex. 2 | Ex. 3 | Ex. 4 | Com. Ex. 1 | Com. Ex. 2 | Com. Ex. 3 |
|---|---|---|---|---|---|---|---|---|---|---|
| Epoxy resin | EHPE3150 | Mw 1,800 (polymerization degree: about 10 to 15) | 170 to 190 | 1.00 | 0.60 | 1.00 | 1.00 | 1.00 | — | — |
| | TETRAD-C | 366.5 | 91.6 | — | 0.20 | — | — | — | 1.00 | 1.00 |
| Curing agent (phenol resin) | H-4 | — | 103 to 109 | — | — | — | — | 0.32 | — | — |
| | DL-92 | — | 103 to 109 | 0.35 | 0.35 | 0.35 | — | — | 0.63 | |
| | MEH-7500 | — | 95 to 99 | — | — | — | 0.33 | — | — | — |
| Curing agent (amine type) | BACM | 210.36 | 52.6 | — | — | — | — | — | — | 0.56 |
| Curing accelerator | 2-Methylimidazole | 82.1 | — | 0.06 | 0.06 | — | 0.06 | 0.06 | 0.074 | — |
| | DBU | 152.24 | — | — | — | 0.06 | — | — | — | — |
| Phase separator | PEG10000 | | | 0.15 | 0.12 | 0.15 | 0.15 | 0.15 | 0.19 | — |
| | PEG200 | | | 2.75 | 2.00 | 2.75 | 2.75 | 2.75 | 3.4 | 4.00 |
| Polymerization result | | | | | | | | | | |
| Porous structure (Swelling ratio) | — | — | — | ○ | ○ | ○ | ○ | x | x | ○ |
| Acid resistance | | — | — | 101% | 104% | 101% | 101% | — | — | 131% |
| Alkali resistance | | — | — | 100% | 101% | 100% | 100% | — | — | 106% |
| Water resistance | | — | — | 100% | 100% | 100% | 100% | — | — | 100% |

Further, a porous epoxy particle (a porous body which is a porous particle) was produced according to the production method described in Examples of WO2017/026424 as follows.

sufficiently remove porogen, residual monomer, and the like, and then dried under reduced pressure to obtain 11.85 g of spherical porous particles (porous body of the present example which is porous particle) made of an epoxy resin.

Figure 2:
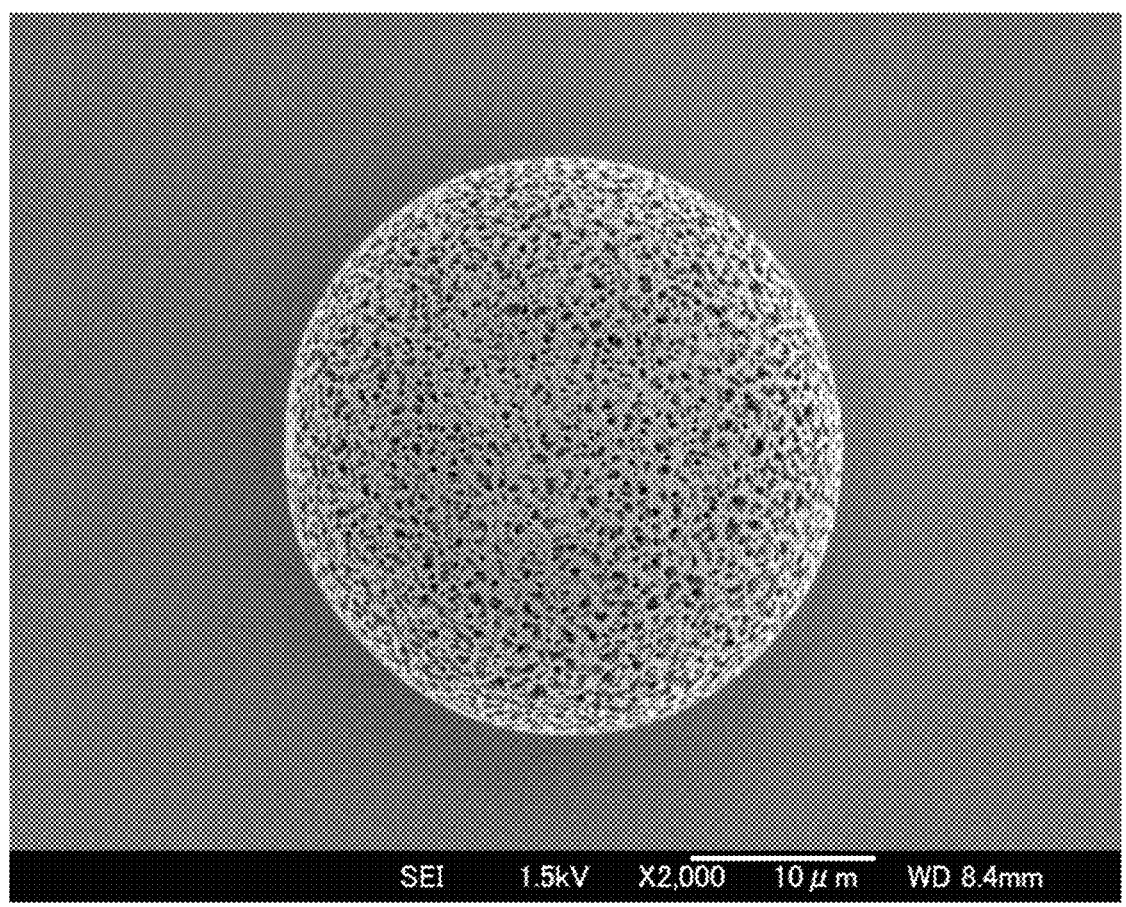
FIG. 2 is a SEM image of the surface of a porous body (particle 1) of Example 5.

The mean particle size of the porous particles was 26 μm. This porous particle had an interconnected pore structure in which holes communicate with each other. The SEM photograph of the appearance of the spherical porous particle (spherical fine particle) and the inside of the particle is shown in FIG. 2. There was no skin layer on the surface of the porous epoxy resin particle, and the end of the through hole was open toward the outside of the porous particle. The particle having a mean particle size of 26.7 μm (using a laser-type particle sizer) and a pore diameter of 330 nm (using a mercury intrusion porosimeter) was obtained.

Example 6: Particle 2

Figure 3:
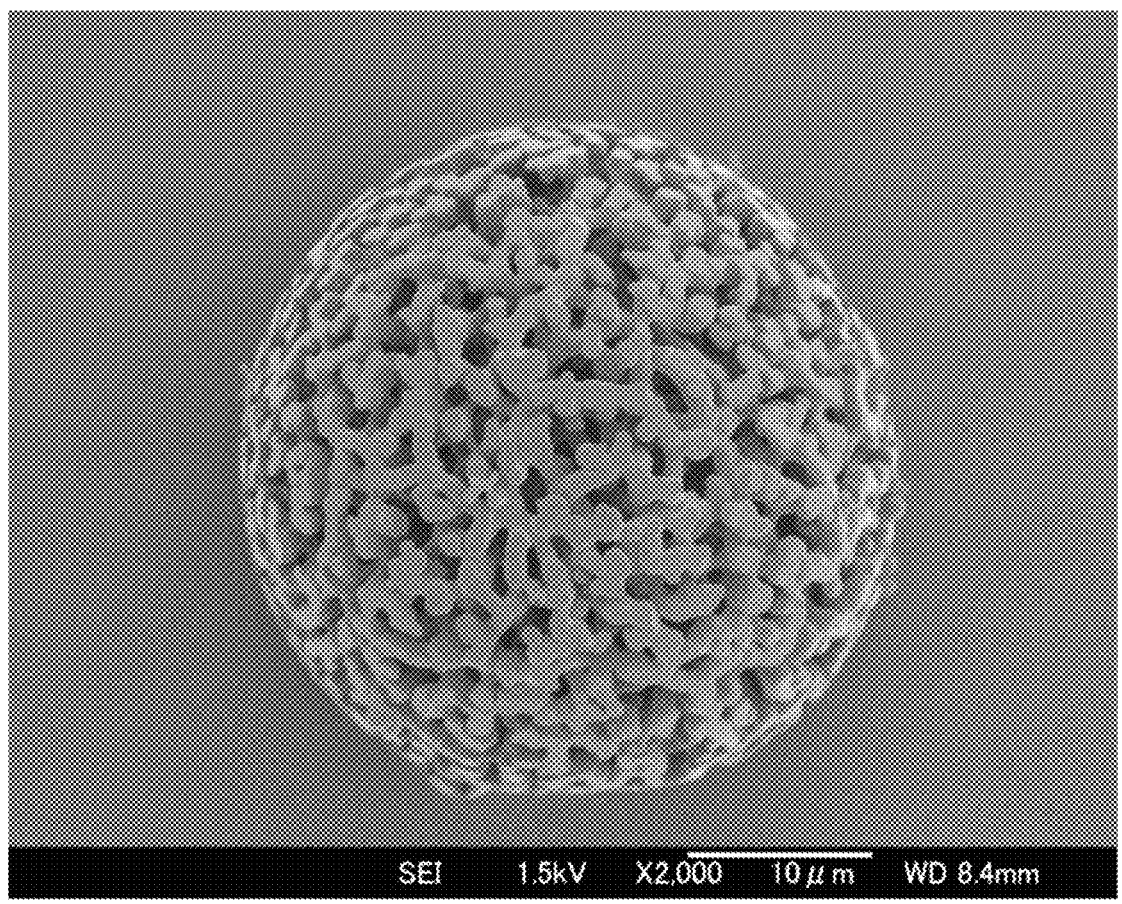
FIG. 3 is a SEM image of the surface of a porous body (particle 2) of Example 6.

The porous epoxy particles of the present example (the porous body of the present invention which is a porous particle) were obtained in the same manner as in [Example 5: Particle 1] except that the amount of polyethylene glycol 10000 (manufactured by Wako Pure Chemical Industries, Ltd.) used was changed to 1.88 parts by weight. The epoxy particles had a mean particle size of 29.4 μm and a pore diameter of 1100 nm (using a mercury intrusion porosimeter). In addition, this porous particle had an interconnected pore structure in which holes provided inside the porous body communicate with each other. The SEM photograph of the appearance of the spherical porous particle (spherical fine particle) and the inside of the particle is shown in FIG. 3. As shown in FIG. 3, there was no skin layer on the surface of the porous epoxy resin particle, and the end of the through hole was open toward the outside of the porous particle.

Comparative Example 4: Particle 3

(Preparation of Epoxy Monomer Composition)

As an epoxy monomer, 2.00 parts by weight of an epoxy compound (trade name "TETRAD-C", Mitsubishi Gas Chemical Company, Inc) represented by the following formula (1) and having an epoxy equivalent of 95 to 110 (102 on average) was used. As a curing agent, 1.15 parts by weight of bis(4-aminocyclohexyl)methane (Tokyo Chemical Industry Co., Ltd.) represented by the following formula (2) and having an amine value of 520 to 550 was used. As a porogen, 8 parts by weight of polyethylene glycol 200 (Wako Pure Chemical Industries, Ltd.) represented by the following formula (3) and having an average molecular weight of 200 was used. They were mixed together for 5 minutes using a planetary centrifugal mixer "Awatori Rentaro" (trade name, THINKY CORPORATION). Thus, an epoxy monomer composition was obtained.

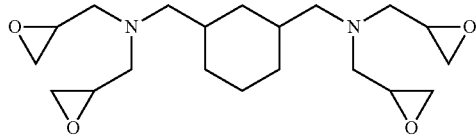

(1)

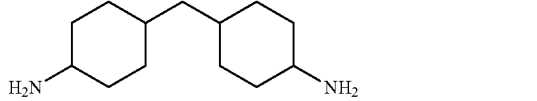

(2)

(3)

(Dispersion Preparation Step)

In a cylindrical glass sample bottle (inner diameter: 19 mm, height: 60 mm), 11.15 g of the epoxy monomer composition obtained in the above was added to a mixture obtained by dissolving 0.6 g of the above block copolymer (dispersant) K-1 in 10 g of dodecane as a dispersion medium. Thus, a dispersion was prepared.

(Polymerization Step and After-Treatment)

The dispersion was stirred with stirring blades rotated at 2000 rpm for 30 minutes at an ordinary temperature to achieve emulsified dispersion. Thereafter, the number of revolutions per minute was reduced to 50 rpm, which is the number of revolutions per minute sufficient to prevent the particles from settling down or binding to each other, and the dispersion was stirred in a high temperature bath at 140° C. for 60 minutes to cause polymerization. The product obtained through the polymerization was added to MEK, and the resultant mixture was stirred sufficiently. Thereafter, the mixture was centrifuged to separate particles. This washing step using the MEK was repeated to a total of 10 times to remove the porogen, the remaining monomer, and the like sufficiently. Thereafter, the remaining mixture was vacuum-dried. As a result, 2.85 g of spherical porous epoxy resin particles were obtained. The mean particle size of the porous particles was 28 μm. These porous epoxy resin particles each had an interconnected pore structure in which through holes provided inside the porous particle communicate with each other. Further, these porous epoxy resin particles had no skin layer on their surfaces, and ends of the through holes were open toward the outside of the porous particles.

With respect to the porous particles of Examples Sand 6 and Comparative Example 4, the swelling ratio was measured in the same manner as in Examples 1 to 4 and Comparative Examples 1 to 3, except that particles were placed in a graduated cylinder and immersed in an aqueous solution of pure water of ordinary temperature (25° C.), 1 mole hydrochloric acid, and caustic soda and left for 24 hours, and thereafter the height was measured. The results are shown in Table 2 below.

[Table 2]
[Example 5: Particle 1] Pure water: 100%, 1M caustic soda aqueous solution: 101%, 1M hydrochloric acid aqueous solution: 105%
[Example 6: Particle 2] Pure water; 100%, 1M caustic soda aqueous solution: 101%, 1M hydrochloric acid aqueous solution: 106%
[Comparative Example 4: Particle 3] Pure water: 100%, 1M caustic soda aqueous solution: 114%, 1M hydrochloric acid aqueous solution: 188%

As shown in Table 1 and Table 2 above, the porous bodies of Examples had a smaller swelling ratio compared with the porous bodies of Comparative Examples, particularly under acidic conditions, so that it was verified that swelling under acidic conditions could be suppressed.

Furthermore, when the porous particles of Examples 5 and 6 were used as a separating agent for chromatography, good separation characteristics could be obtained.

INDUSTRIAL APPLICABILITY

As described above, according to the present invention, it is possible to provide a porous body, the swelling of which under acidic conditions is suppressed, and a method for producing the porous body. The use of the porous particles of the present invention is not particularly limited. For example, the porous particles of the present invention are very useful as a novel adsorptive separating agent. More specifically, the porous particles of the present invention can be used as a separating agent for chromatography, for example. Examples of a target substance to be separated by chromatography include: biological substances such as proteins, peptides, amino acids, and nucleic acids; and other chemical substances. The use of the porous particles of the present invention is not limited thereto. For example, the porous particles of the present invention are applicable to various uses, and can be used as, for example, fillers for use in cosmetics, fillers for use tires, fillers for use in paint and ink, excipients for sustained-release drugs, and fillers for use in column reactors carrying a reaction catalyst.

This application claims priority from Japanese Patent Application No. 2019-038971 filed on Mar. 4, 2019. The entire subject matter of the Japanese Patent Applications is incorporated herein by reference.

The invention claimed is:

1. A porous body formed of a copolymer of an epoxy compound and a curing agent, wherein
   the curing agent is a phenolic compound,
   the porous body is a porous body containing no primary to tertiary amino groups and has an interconnected pore structure in which holes provided inside the porous body communicate with each other, wherein the holes are formed by spinodal decomposition, and
   the phenolic compound is a phenolic compound containing three or more phenolic hydroxyl groups in one molecule.
2. The porous body according to claim 1, wherein the epoxy compound is an epoxy compound containing no primary to tertiary amino groups.
3. The porous body according to claim 1, wherein the epoxy compound is an epoxy compound containing no nitrogen atom to be quaternized by acid treatment.
4. The porous body according to claim 1, wherein the epoxy compound is an epoxy compound represented by the following chemical formula (E1):

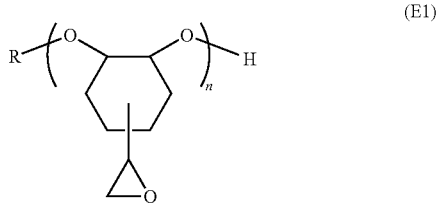

(E1)

where in the chemical formula (E1), n is a positive integer, and R is a hydrogen atom or a substituent.
5. The porous body according to claim 2, wherein in the chemical formula (E1), n is 10 to 15.
6. The porous body according to claim 2, wherein the epoxy-compound represented by the chemical formula (E1) is a 1,2-epoxy-4-(2-oxiranyl)cyclohexane adduct of 2,2-bis(hydroxymethyl)-1-butanol.
7. The porous body according to claim 4, wherein an epoxy group in the epoxy compound is 1.1 to 4 equivalents to 1 equivalent of the phenolic hydroxyl groups in the curing agent.
8. The porous body according to claim 1, wherein the curing agent is a curing agent containing no primary to tertiary amino groups.
9. The porous body according to claim 1, wherein the curing agent is a curing agent containing no nitrogen atom to be quaternized by acid treatment.
10. The porous body according to claim 1, wherein the interconnected pore structure in which holes communicate with each other is an interconnected pore structure in which through holes communicate with each other.
11. The porous body according to claim 10, wherein ends of the through holes are open toward an outside of the porous body.
12. The porous body according to claim 1, which is a porous particle.
13. The porous body according to claim 12, wherein the porous particle is a substantially spherical particle.
14. The porous body according to claim 12, wherein each of the porous particle is shaped so that the longest diameter is not more than 1.6 times the shortest diameter.
15. The porous body according to claim 12, wherein each porous particle has a mean particle size in a range from 0.5 to 30,000 pin.
16. A method for producing a porous body according to claim 1, the method comprising:
    a dispersion preparation step of preparing a dispersion by dispersing a porous body raw material comprising an epoxy compound and a curing agent in a dispersion medium; and
    a polymerization step of polymerizing the porous body raw material in the dispersion, wherein
    in the polymerization step, the holes are formed by spinodal decomposition.
17. The method according to claim 16, wherein in the dispersion preparation step, a curing accelerator is further dispersed in a dispersion medium.
18. The method according to claim 16, wherein in the dispersion preparation step, the porous body raw material is dispersed in the dispersion medium together with a dispersant.
19. The method according to claim 18, wherein the dispersant is a surfactant.
20. The method according to claim 18, wherein the dispersant is a block copolymer comprising a hydrophobic polymer block and a hydrophilic polymer block.
21. The method according to claim 20, further comprising:
    a dispersant production step of producing the dispersant, wherein
    the dispersant production step comprises:
      a first living radical polymerization step of forming one of the hydrophobic polymer block and the hydrophilic polymer block by living radical polymerization; and
      a second living radical polymerization step of forming the other one of the hydrophobic polymer block and the hydrophilic polymer block by living radical polymerization after the first living radical polymerization step.

* * * * *